United States Patent [19]

Moller

[11] 4,307,629
[45] Dec. 29, 1981

[54] TORQUE CONVERTER

[76] Inventor: Paul S. Moller, Rte. 1, Box 88A, Dixon, Calif. 95620

[21] Appl. No.: 929,529

[22] Filed: Jul. 31, 1978

[51] Int. Cl.³ ............................................. F16H 3/74
[52] U.S. Cl. ..................... 74/752 F; 74/802; 74/394; 74/401; 74/403; 74/751; 74/424.5
[58] Field of Search ..................... 74/751, 752 F, 802, 74/394

[56] References Cited

U.S. PATENT DOCUMENTS

| | | | |
|---|---|---|---|
| 1,864,824 | 6/1932 | Hobbs | 74/752 F |
| 1,928,244 | 9/1933 | Berlin | 74/34 |
| 2,033,343 | 3/1936 | Larkin | 74/752 F |
| 2,079,691 | 5/1937 | Joyce | 74/752 F |
| 2,098,071 | 11/1937 | Tasso | 74/751 |
| 2,149,560 | 3/1939 | Teece | 74/751 |
| 2,353,334 | 7/1944 | Haugh | 74/751 X |
| 2,571,159 | 10/1951 | Osgood | 74/751 |
| 2,881,642 | 4/1959 | Dodge | 74/751 |
| 2,891,420 | 6/1959 | Simmons | 74/752 F |
| 3,130,606 | 4/1964 | Keris | 74/751 |
| 3,540,310 | 11/1970 | Preston | 74/752 |
| 3,960,036 | 6/1976 | Moller | 74/752 F |

Primary Examiner—Nile C. Byers, Jr.
Attorney, Agent, or Firm—Roy L. Brown

[57] ABSTRACT

A torque converter for inclusion between a driving shaft and a driven shaft. Preferably there is more than one torque generator and a gear train in parallel between the input and output shafts. The torque generators and any attached driving gears rotate about shafts whose axes are preferably symmetrically displaced about, and are stationary relative to, the axis of the input shaft. The above mentioned torque generators each preferably have a pair of radially opposed eccentrically mounted weights thereon. Preferably there are at least two pairs of weights on each torque generating train, together with means for varying the phasing between the pairs of weights. Means is also provided for accommodating slight misalignments between the shafts of the torque generating trains. Each of the torque generating trains has attached thereto at least one unidirectional clutch which allows the shafts to turn in only one direction. Means are also provided for delivering torque from the torque generating trains to the output shaft and for reversing the direction of the output shaft torque.

10 Claims, 27 Drawing Figures

TORQUE CONVERTER

BACKGROUND OF THE INVENTION

To extract maximum power from a given engine, a continuously variable transmission delivers an average integrated output torque that is inversely proportional to the rotational speed of the output shaft. That is the condition for constant output power, and it also means that the input power remains constant at all output speeds except for small friction losses of the transmission. Such a power characteristic is particularly attractive to maximize the operating efficiency and power output from an internal combustion engine or for meeting varying load conditions from a constant angular velocity source such as an electric motor or a turbine engine.

U.S. Pat. No. 3,960,036 was directed toward an inertial type of transmission which has some of the desired characteristics. The apparatus of this invention is an improvement upon the apparatus of that patent.

The apparatus of this invention is a transmission that accommodates continuous changes of angular velocity of both the input and output shafts. The engine is allowed to operate at the angular velocity for maximum efficiency at a given load. The apparatus does not depend on friction, fluids, or gear changes.

A typical automatic transmission operates between 30% and 90% efficiency. In contrast, the apparatus of this invention operates between 92% and 98% efficiency. More importantly, the apparatus' ability to keep an engine operating at peak power and peak efficiency allows the engine displacement to be reduced by more than half with the same automotive performance.

Rand Corporation's Survey, "How to Save Gasoline: Public Policy Alternatives for the Automobile", Number R-1560-NSF, October 1974, showed that a continuously variable transmission, if used in the United States automobiles, would reduce gasoline consumption by 26% or 71 million gallons per day. This study did not include the benefits of reduced engine displacement. Studies show that the apparatus of this invention will reduce United States gasoline consumption by 38% or 104 million gallons per day.

The apparatus is also useful on a bicycle wherein a rider is a power source who operates most efficiently and comfortably at a substantially constant pedal speed. The apparatus of the invention allows the torque delivered to the wheels of the bicycle to increase as the wheel reduces speed.

The apparatus of this invention is also useful in electric automobiles wherein a shunt wound motor could be used, thereby resulting in a substantial reduction in battery load, electric cables, relays and motor size. In addition, battery life and range would be greatly enhanced by using less than the large outrush current required with the usual direct drive series wound motor.

In a turbine driven car the high angular momentum of a turbine usually requires a continuous match between engine angular drive velocity and the drive wheel spaced. The apparatus of this invention allows the turbine to be driven at a high speed and over a small range of angular velocities while the driven shaft torque and angular velocity is not directly related to the input angular velocity.

Presently locomotives require large torque and speed range which dictates the use of expensive and complex diesel/generator/electric motor drives. These can be eliminated by the apparatus of this invention.

Previous continuously variable transmissions have been too expensive and heavy to use in comparatively low cost utility power equipment. It is expected that this invention will be adopted to reduce such costs.

Trucks need both a large torque range and a wide speed range. In the past they have required a gear box with as many as twenty gear changes. The continuously variable transmission of this invention avoids that requirement.

Obviously a large range of power and torque requirements will need to be designed into the individual apparatus. That is, the bicycle and the truck, for example, would not have the same transmission, although their basic kinematic and dynamics would be similar.

BRIEF DESCRIPTION OF THE INVENTION

The apparatus of this invention has an input shaft, an output shaft, and preferably three or more torque generating trains each having a rotatable shaft whose axes are fixed relative to the axis of an input shaft. Preferably there are three torque generating trains which are symmetrically positioned 120 degrees apart about that input axis. If desired, there may be more than three torque generating trains, and where high torques are needed there may indeed be more.

In a preferred first embodiment, each of the torque generating trains has thereon a pair of double-weight torque generators wherein the weights are eccentrically mounted upon the shaft of their respective torque generating trains.

Each of the torque generators has a gear-driven cage which is free to rotate upon its respective torque generating train shaft. In each torque generator a pair of substantially identical weights are mounted for freedom of rotation relative to a pair of cylindrical bearing surfaces which are eccentrically positioned relative to the axis of their torque generating train shafts and which have their eccentricities 180 degrees apart on the shafts. Linkages connect to cage and the weights to constrain the motion of the weights to a substantially radial direction relative to the cage. As the cage is spun about the axis of its torque generating train, the eccentrically mounted weights are also spun with the cage, and the weights apply torques to the shafts of their torque generating trains.

In the preferred first embodiment, the torque generators are substantially identical, and means is provided for varying the phase between the torques generated by the first and second torque generators on each torque generating train shaft.

Uni-directional clutches are attached to each of the torque generating shafts to prevent its reversal and to rectify the delivered torque.

Means may also be provided for synchronizing the angular positions of the torque generating train shafts and for allowing for slight deviations between their angular positions. To that end, a synchronizing gear together with a shaft forming a torsion spring concept may be used.

Means may also be provided for reversing the direction of the output shaft.

It is therefore an object of this invention to provide a mechanical transmission capable of delivering power from a source to a load over a wide and continuous range of source and load speeds.

It is also an object of this invention to provide a transmission wherein the output power is substantially the same as the input power.

It is likewise an object of this invention to provide a torque converter.

It is another object of this invention to divide torque and power between a torque converter and a bypass shaft.

A BRIEF DESCRIPTION OF THE DRAWINGS

Other objects will become apparent from the following description, taken together with the accompanying drawings in which.

DETAILED DESCRIPTION OF THE INVENTION

In the following description, the apparatus is described kinematically. The dynamics of the individual torque generators, however, also will be described. Thus, certain elements may be shown with hatched marks indicating that they are attached to the frame, but with no actual attachment to the frame shown. Further, the housing is shown generally in the shape of a circularly cylindrical can, and it should be noted that the actual shape of the housing would likely be substantially different.

Figure 1:
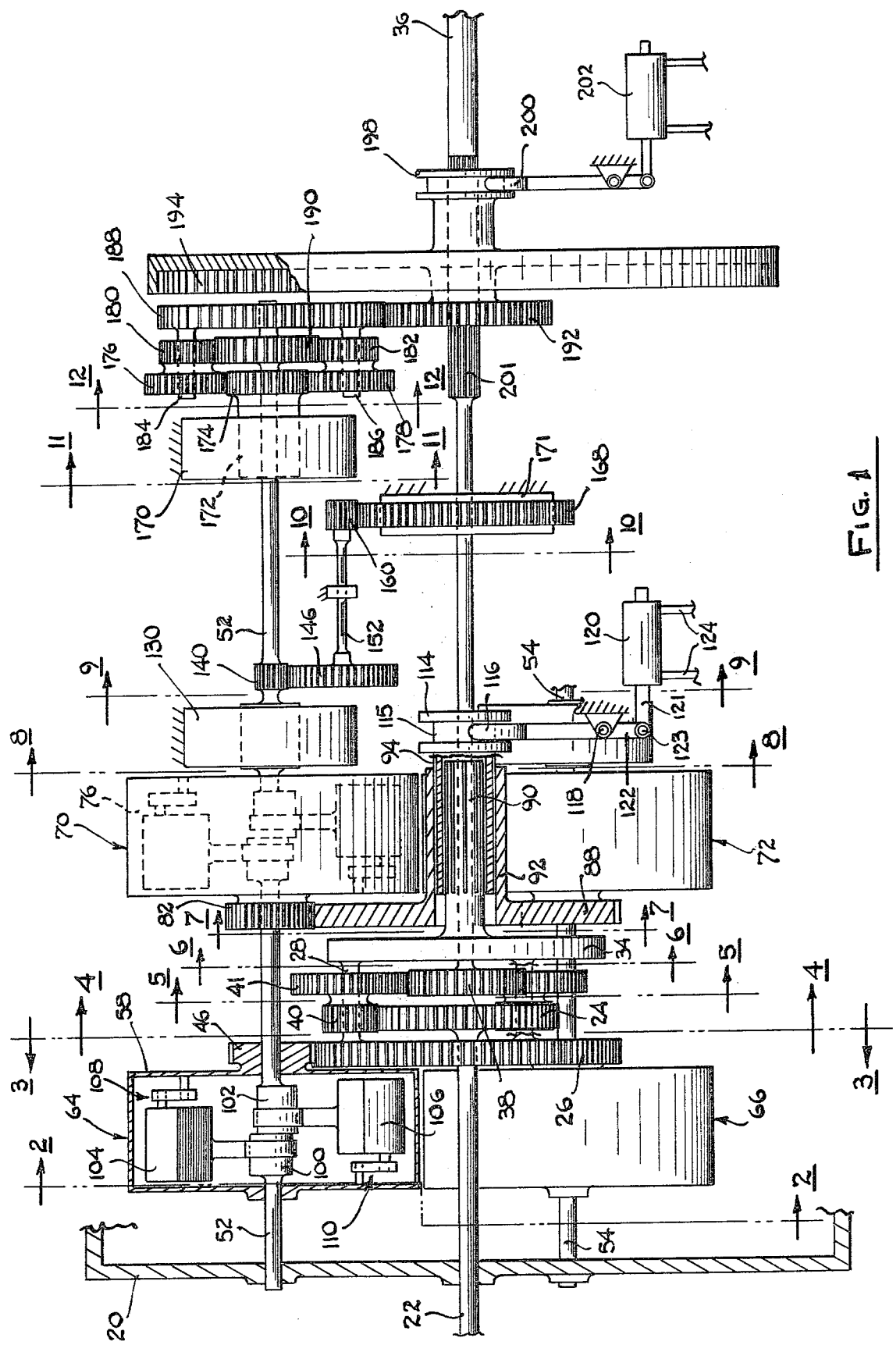
FIG. 1 is a side view, partly broken away, showing a preferred first embodiment of the invention.

FIG. 1 is a side view of a first preferred embodiment of the invention. One of the torque generators is shown in detail, together with significant portions of the input and output shafts and their attachments. Further details will be observed from the various sections which are shown in FIGS. 2 through 12.

The input shaft 22 is mounted for rotation relative to the housing 20, and it is supported upon bearings relative to that housing. The input shaft 22 is rigidly attached to a driving first sun gear 24, shown more particularly in FIG. 4.

Figure 2:
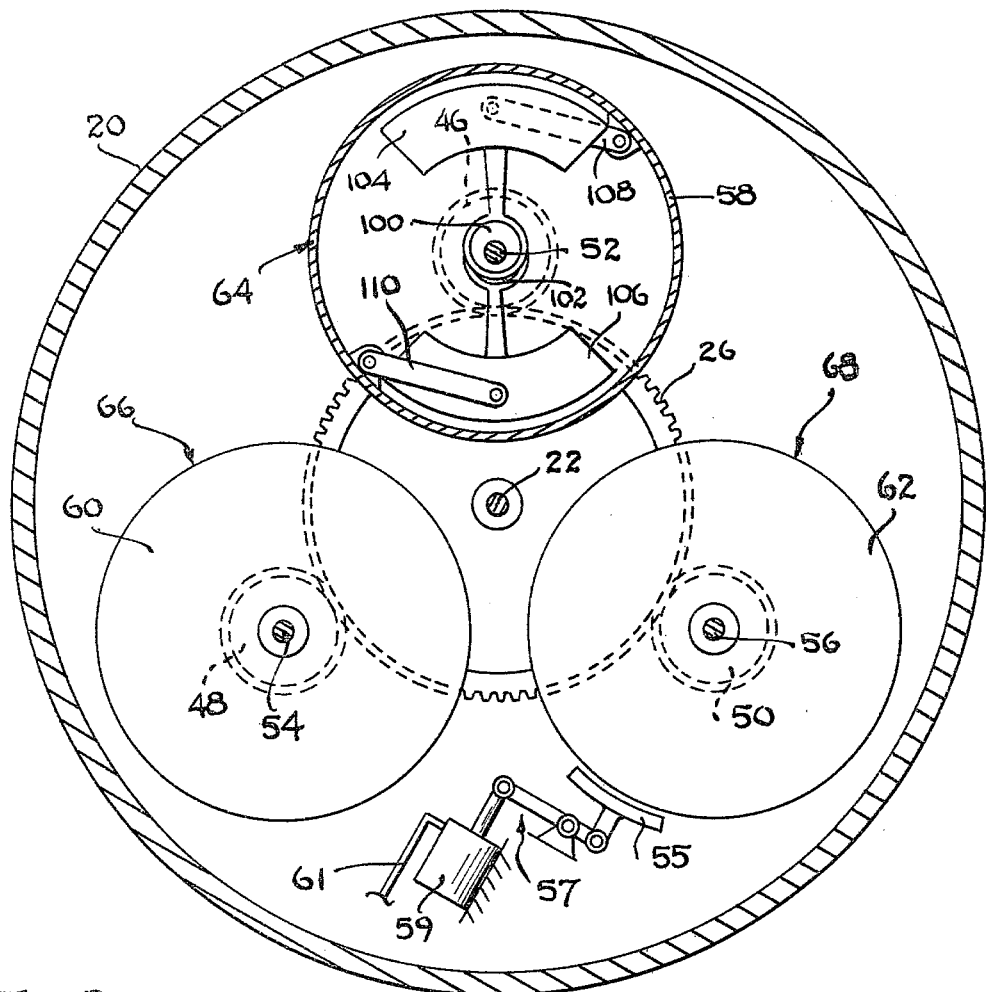
FIG. 2 is a partly sectional view taken at 2—2 in FIG. 1.
Figure 3:
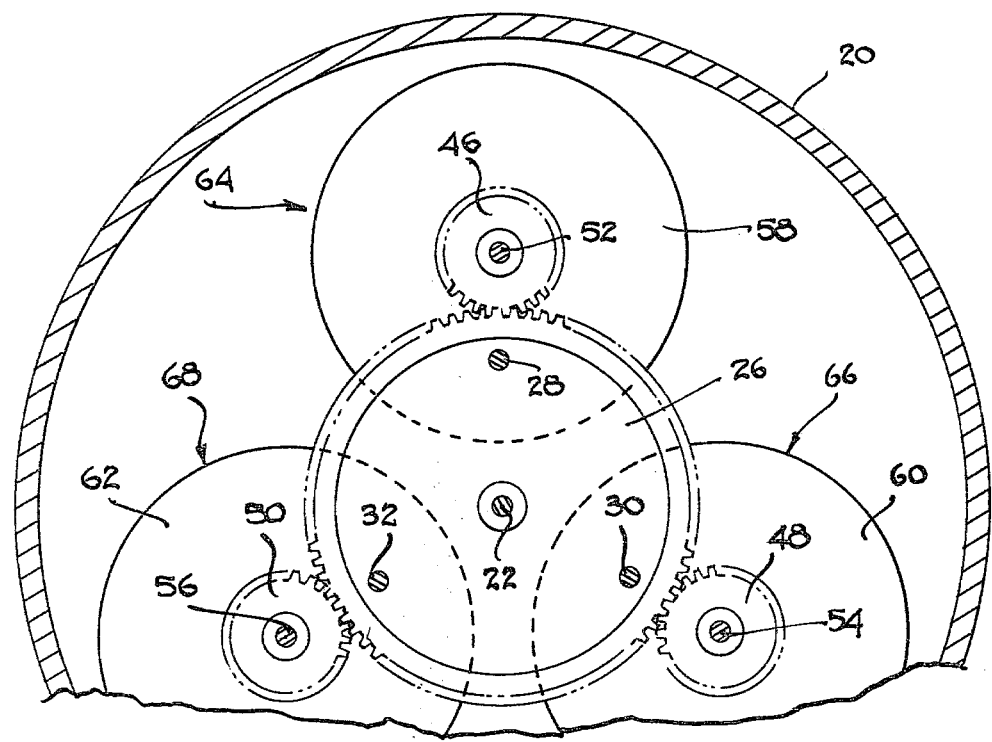
FIG. 3 is a partly sectional view taken at 3—3 in FIG. 1.
Figure 4:
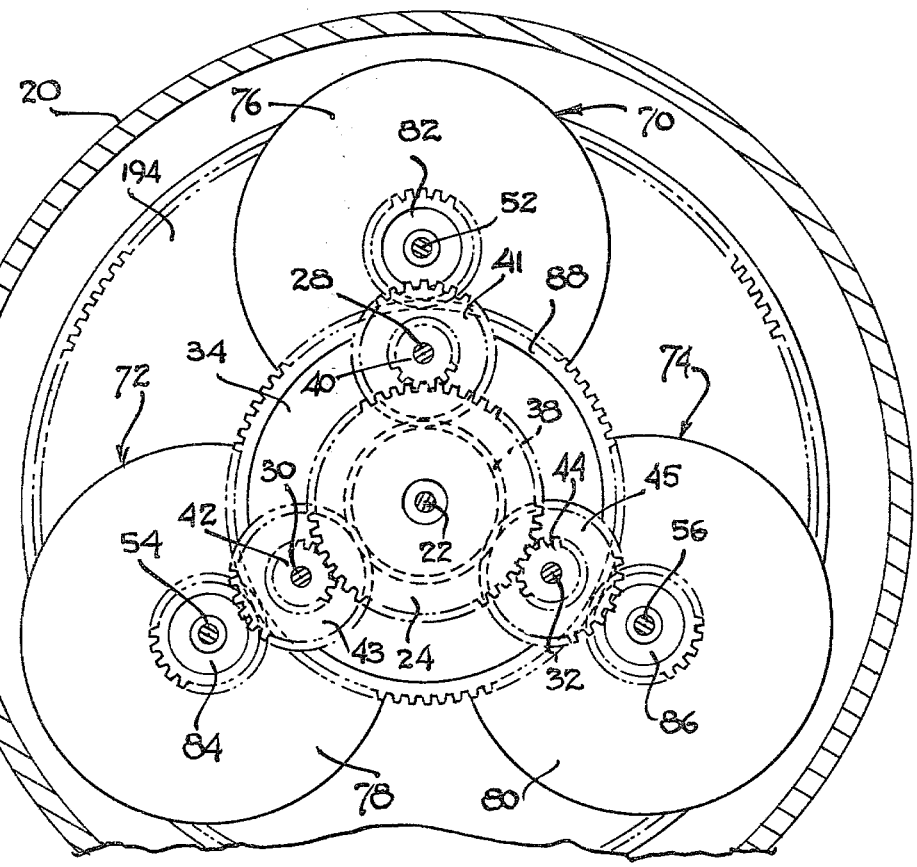
FIG. 4 is a partly sectional view taken at 4—4 in FIG. 1.
Figure 5:
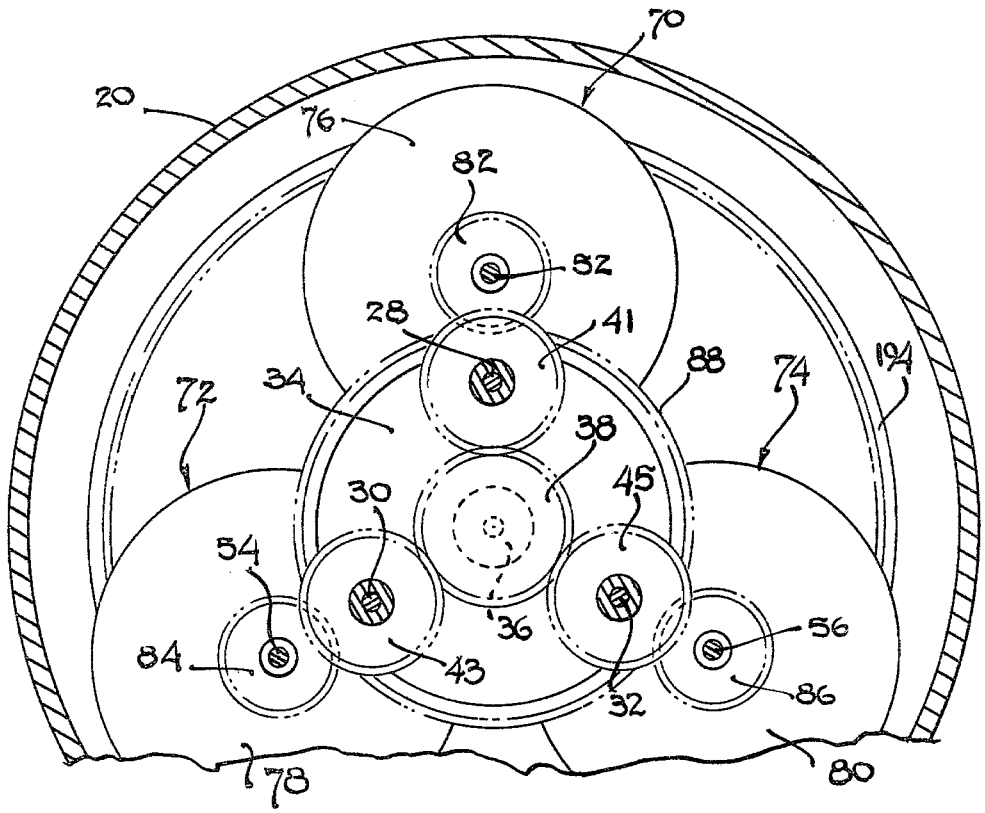
FIG. 5 is a partly sectional view taken at 5—5 in FIG. 1.
Figure 6:
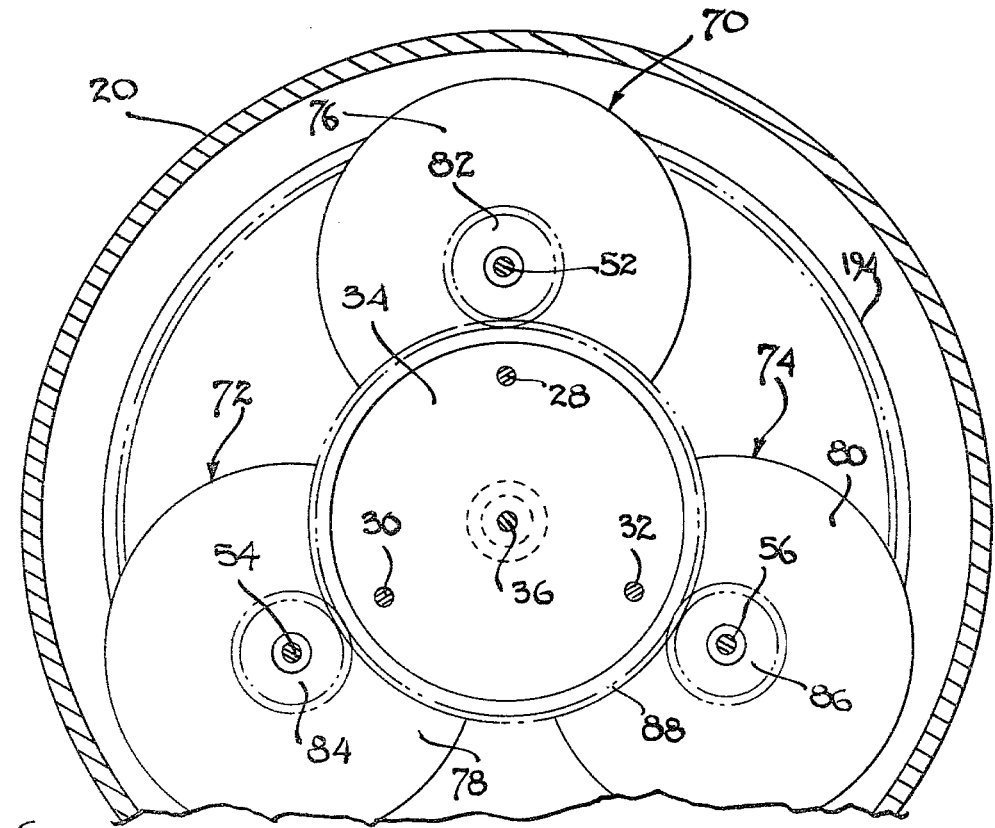
FIG. 6 is a partly sectional view taken at 6—6 in FIG. 1.
Figure 7:
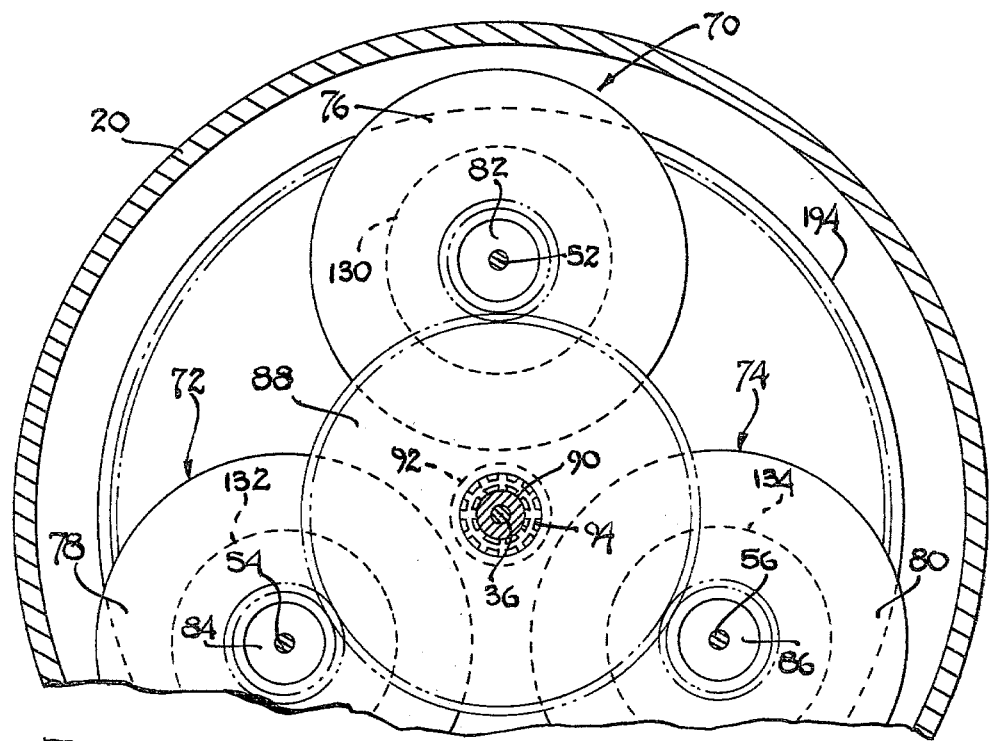
FIG. 7 is partly sectional view taken at 7—7 in FIG. 1.

As shown in FIGS. 2 and 3, a second sun gear 26 is mounted for free rotation on the input shaft 22. FIGS. 3 through 6 show that three shafts 28, 30 and 32 are rigidly attached to the sun gear 26, and they are also rigidly attached to the hub 34 as shown in FIG. 6. Hub 34 is shown as a circular disk, but it may have spokes or be of some other shape. The hub 34 is mounted for rotation relative to the output shaft 36 as shown particularly in FIG. 6.

An output axis third sun gear 38 is attached to the input end of the output shaft 36.

Three coaxial double planetary gear pairs 40–41, 42–43 and 44–45 are mounted on the shafts or spindles 28, 30 and 32, respectively. The gears of each gear pair are rigidly attached to each other, coaxial and mounted on their respective spindles. Planetary gears 40, 42 and 44 mesh with the sun gear 24. The planetary gears 41, 43 and 45 are larger than gears 40, 42, 44, and they mesh with the smaller sun gear 38.

Three planetary gears 46, 48 and 50 are mounted for free rotation on the torque generating train shafts 52, 54 and 56, respectively. Gears 46, 48 and 50 are rigidly attached to the torque generator cages 58, 60 and 62 of the torque generators 64, 66 and 68, respectively. Cages 58, 60 and 62 are also mounted for free rotation on the shafts 52, 54 and 56, respectively.

The torque generators 70, 72 and 74 each have cages 76, 78 and 80, respectively, which are freely rotatable on the torque generating train shafts 52, 54 and 56, respectively. The planetary gears 82, 84 and 86 are freely rotatable on the torque generating shafts 52, 54 and 56, respectively, and they are attached to the cages 76, 78 and 80, respectively, to rotate therewith. The planetary gears 82, 84 and 86 mesh with the sun gear 88.

Each of the torque generators is the same. Referring to FIGS. 1 and 2, the journal bearing surfaces 100 and 102 are eccentrically mounted on Shaft 52 with their axes equally displaced from, but on opposite sides of the axis of shaft 52. Corresponding journal bearings in torque generator 70 are coaxial with the bearing surfaces 100 and 102. Weights 104 and 106 are mounted for free rotation on bearings 100 and 102, respectively. The weights 104 and 106 are constrained by pivoted linkages 108 and 110, respectively, to substantially radial movement relative to cage 58.

In operation of the torque generator 64, as cage 58 turns relative to the shaft 52, the weights 108, 110 assume various angular positions relative to the plane of the axes of eccentric bearings 100, 102. Due to the inertia of the weights 108, 110, radial force is delivered from the weights 108, 110 to the bearings 100, 102. When the weights 104, 106 are positioned as shown in FIG. 2, the radial forces produce no torque on the shaft 52 because such forces pass through the axis of shaft 52. However, note that the cage 58 and weights 104, 106 may have any angular position relative to the shaft 52, and in any position, except the one shown, the radial forces produce a torque on the shaft 52. The links 108, 110 allow only limited substantially radial movement of the weights 104, 106 relative to the cage 58. The movement of weights 104, 106, however, because of the finite length of the linkages 108, 110, does have some angular component about the respective axes of the bearings 100, 102.

The sun gear 88 is rigidly attached to a coaxial sleeve 92 having spiral splines on the interior surface thereof. Rigidly attached to the output shaft 36 is a coaxial sleeve 90 having straight splines on the exterior thereof. If desired, instead of a sleeve 90, the shaft 36 may be enlarged with the splines directly on the shaft. A cylindrical member 94 is positioned in the annular region between the sleeves 90 and 92. The cylindrical member 94 has straight splines on its interior surface matching the splines on the exterior of sleeve 90 and spiral splines on its exterior surface matching the splines on the interior of the sleeve 92, whereby motion of the cylindrical member 94, in the direction of the axis of shaft 36, causes the gear 88 to advance or retreat angularly through a controlled phase angle about the axis of shafts 22 and 36 relative to the gear 26.

Attached to the end of the cylindrical member 94 is a spool 114. A fork 116 slidingly engages the central groove 115 of the spool so that motion of the fork 116 in the direction of the axis of shaft 36 causes the sleeve 94 to move inward and outward in the space between sleeves 90 and 92, whereby motion of the spool 114 and the sleeve 94 advances or retards the angular phase position of the cage 76 and its corresponding weights relative to the cage 58 and its weights 104 and 106. With the weights of torque generator 70 in phase with the weights of torque generator 64, a maximum torque is produced. When they are opposite in phase, however, no net torque is produced. The weights of torque generators 72 and 80 are also advanced or retarded through the same phase angle relative to the weights of generators 66 and 68.

The fork 116 is pivoted on stationary pivot 118, and it is driven by, for example, a hydraulic cylinder 120 having a piston rod 121 connected to the lever 122 by a pin 123. The piston 120 may be double acting, whereby it is controlled in both directions of its stroke. Hydraulic lines 124 are taken to a controlled hydraulic source (not shown) which, in turn, may be servo controlled or controlled by a computer in response to some function of required power, torque, angular velocity, angular velocity difference, engine efficiency, cylinder pressure, armature current, or the like.

Figure 8:
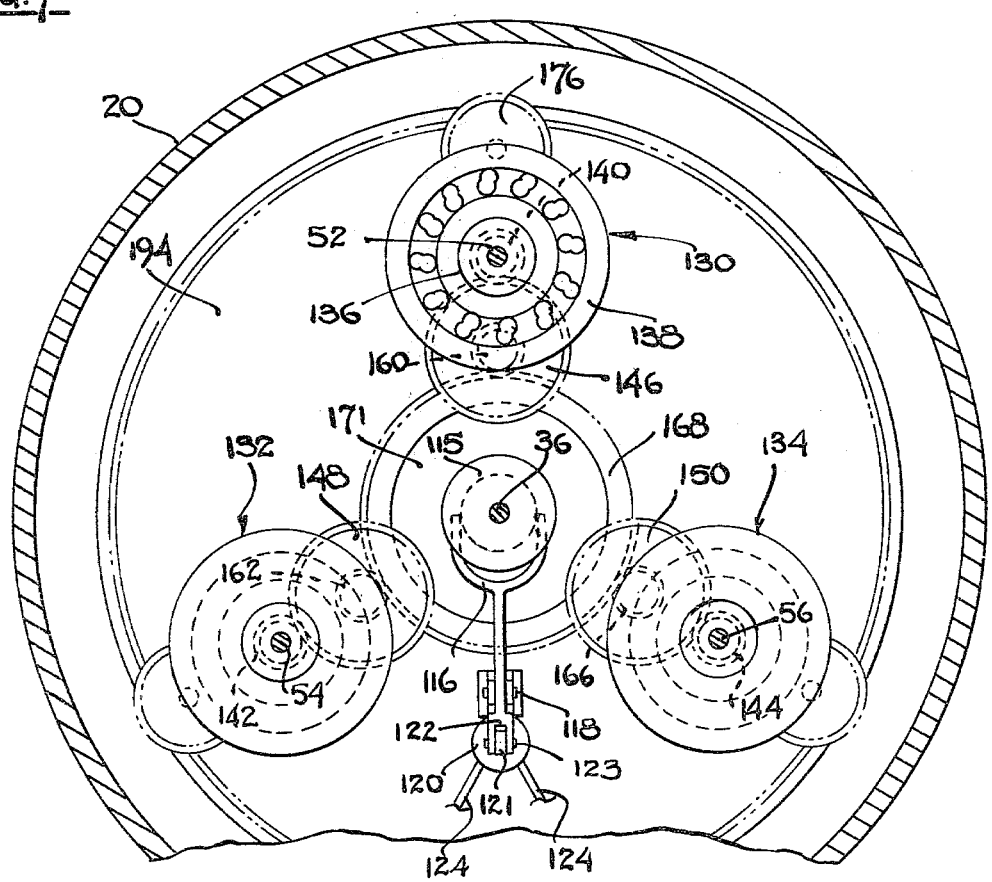
FIG. 8 is a partly sectional view taken at 8—8 in FIG. 1.

Each of the torque generating train shafts 52, 54 and 56, as shown in FIG. 8, has thereon undirectional or overriding clutches 130, 132 and 134, respectively. A typical unidirectional clutch has an inner race 136, an outer race 138, and a plurality of members which are shaped to jamb the races when an attempt is made to turn one race in one direction relative to the other, and to allow it to freewheel when the attempt is made to turn in the other direction.

Figure 10:
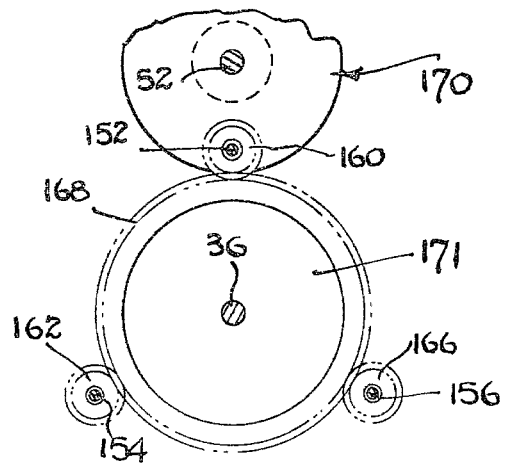
FIG. 10 is a partly sectional view taken at 10—10 in FIG. 1.
Figure 9:
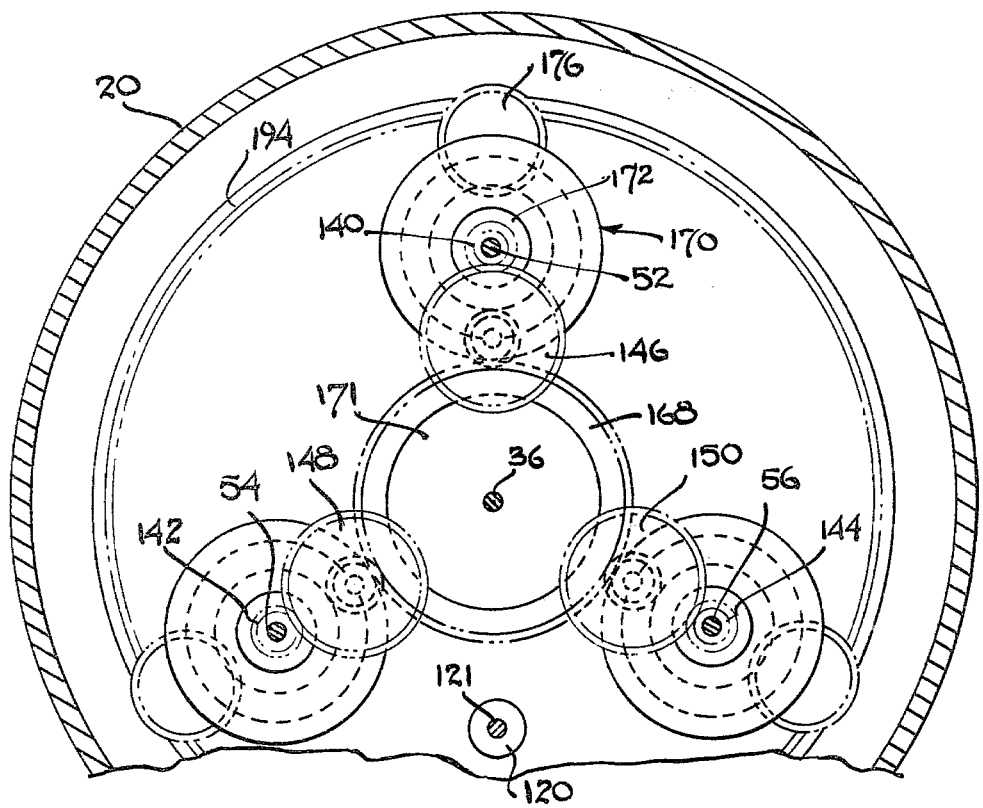
FIG. 9 is a partly sectional view taken at 8—9 in FIG. 1.

Referring to torque generator 64 of FIG. 2, the eccentric axes of bearings 100 and 102, together with the axis of shaft 52 define a plane. The eccentric axes of the two eccentric bearings (not shown) within the torque generator 70 also typically remain in the same plane as the plane of the axes of 100, 102 and 52. That plane continually rotates with the shaft 52. The corresponding eccentric bearings in torque generators 68 and 74 have their axes in a plane which is 120 degrees from the plane of the bearings of torque generators 64 and 70. The corresponding bearings in torque generators 66 and 72 have the plane of their axes 240 degrees from the plane of the axes of torque generators 64 and 70. To control that relative angular position, the shafts 52, 54 and 56 have spur gears 140, 142 and 144 which engage spur gears 146, 148 and 150, as shown in FIG. 9. FIGS. 1 and 10 show torsion bars 152, 154, 156, which are free to rotate with respect to the housing 20, are attached to spur gears 160, 162 and 166, respectively. The gears 160, 162 and 166 mesh with a ring gear 168 which keeps the three shafts 52, 54 and 56 in synchronism except for the torsion displacement of the torsion bars 152, 154 and 156 and gear teeth slack. The ring gear 168 is mounted on the outer cylindrical drum surface of an annular disc 171. The surface friction between gear 168 and disc 171 is designed to provide just the amount of friction desired to damp oscillations, and the like. The torsion of torsion bars 152, 154 and 156 is such that precision gears need not be used. The disc 171 is anchored to the housing 20.

As an alternative, the plane of the axes of the bearings on the torque generating train 52 within the cage 76 need not necessarily lie in the same or parallel planes to the plane of the axes bearings 100, 102. If they do not, however, the weights must be correspondingly turned such that phase advancing and retarding of the cages relative to each other controllably reinforces or opposes the torque generated by the other torque generator on the same shaft. The weights maintain the same angular position as before relative to their own bearings.

Corresponding torque generators, which are positioned 120° apart about the axis of shaft 22, also have their weight pairs phased to produce cyclic torques which are delivered to the common output shaft 36 with phases 120° apart.

Figure 11:
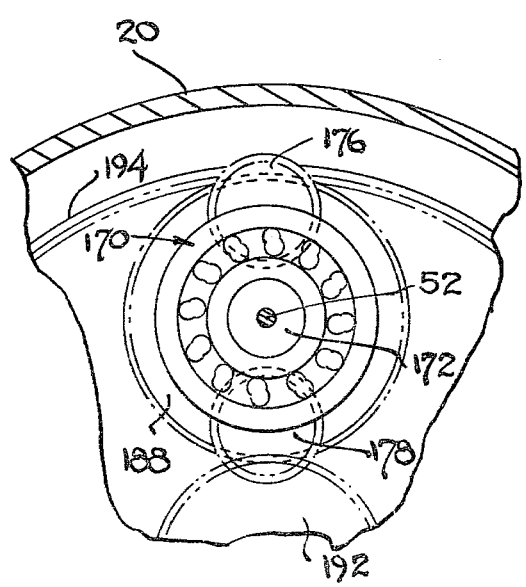
FIG. 11 is a partly sectional view taken at 11—11 in FIG. 1.
Figure 12:
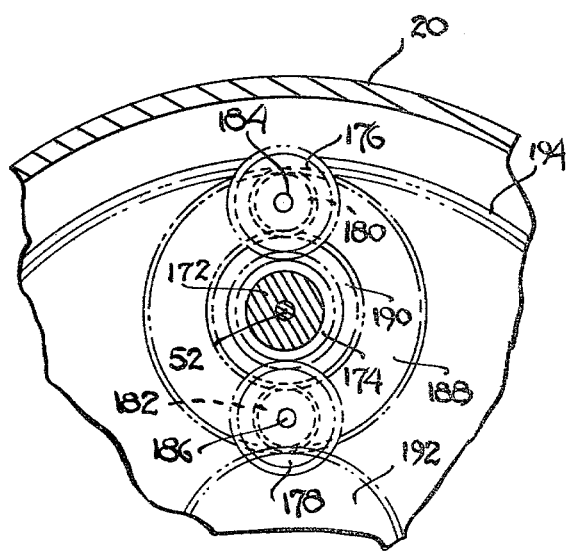
FIG. 12 is a partly sectional view taken at 12—12 in FIG. 1.

Each of the shafts 52, 54 and 56 has a reversing mechanism thereon. Only one reversing mechanism is shown in FIG. 1, and the description of that one reversing mechanism suffices to describe the other two reversing mechanisms (not shown) which are mounted on shafts 54 and 56. The reversing mechanism is shown in FIGS. 1, 11 and 12. A unidirectional clutch 170 has its outer race attached to the frame 20 and its inner race attached to the sleeve 172 which, in turn, is freely rotatable upon the shaft 52. Attached to the sleeve 172 is a sun gear 174. A pair of diametrically opposed planetary gears 176 and 178 engage the gear 174. The planetary gears 176 and 178 are rigidly attached to planetary gears 180 and 182, and they rotate freely upon spindles or shafts 184, 186 which are attached to diametrically opposite sides of the planetary gear 188. Instead of two gears 180, 182, more gears symmetrically disposed about the sun gear 190 and 174 could be used. Gear 188 is free to rotate on the shaft 52. Between the gears 174 and 188, attached to the shaft 52 is a sun gear 190 which engages the two planetary gears 180 and 182. The planetary gear 188 is one of three planetary gears which are attached to the reversing mechanisms on shafts 52, 54 and 56, and it engages the sun gear 192.

The sun gear 192 and the inside ring gear 194 are splined to the output shaft 36, and the gear 188 together with the other three corresponding planetary gears either engage the sun gear 192 for one direction of rotation of shaft 36 or they engage the internal teeth of the internal ring gear 194 for the reverse direction of rotation of the shaft 36.

Because of clutch 130, the shaft 52 turns in only one direction. That direction is such that the turning of shaft 52 and the gear 190 attempts to turn the sleeve 172 in the wrong direction for unidirectional clutch 170, whereby the sleeve 172 remains stationary, and rotation of the shaft 52 causes the planetary gears 176 and 178 to move around the gear 174 to drive the gear 180 which, in turn, is attached either to the sun gear 192 or the ring gear 194. Any attempt to turn the equipment in the reverse direction causes the clutch 170 to free run, whereby further turning of the gear 180 merely causes the gears 176 and 178 to turn the gear 174 and sleeve 172 therewith.

Attached to the sun gear 192 and the ring gear 194 is a collar 198 which engages a fork 200 that is, in turn, operated by the hydraulic cylinder 202 in the same fashion as cylinder 120. Movement of the fork 200 by the cylinder 202 causes the collar 198 to move or slide along the splines 201, thereby to shift the gears 192 or 194 into engagement with gear 188 and the corresponding gears attached to the other shafts 62, 64 and 66.

It is desirable to discuss the operation of the apparatus of FIGS. 1 through 12 in different modes of operation.

Consider the output shaft 36 standing stil or turning slowly. The input shaft 22 has a driving torque applied thereto which turns sun gear 24. Sun gear 24 drives the planetary gears 40, 42 and 44. Because the gear 38 is standing still or turning slowly, the rotation of gears 40, 42 and 44 causes the gears 41, 43 and 45 to ride over the gear 38, thereby driving the spindles or shafts 28, 30 and 32 about the axes of shafts 22 and 36. Since the spindles 28, 30 and 32 are attached to the hub 34 and the gear 26, hub 34 and gear 26 commence rotating about the axis of shaft 22. The rotation of gear 26 about the axis of shaft 22 rotates the planetary gears 46, 48 and 50 about the stationary axes of shafts 52, 54 and 56, together with the torque generator cages 58, 60 and 62. The rotation of hub 34 turns the externally splined sleeve 90 which drives the internally splined sleeve 92 through the intermediate cylindrical member 94. The sleeve 92 drives the gear 88, which, in turn, drives the planetary gears 82, 84, 86 and their attached torque generator housings 76, 78 and 80. The relative angular positions of the weights within the set of housings 58, 60 and 62 and the set of housings 76, 78 and 80 depend upon the axial position of the spool 114 which, in turn, is controlled through the fork 116 by the hydraulic cylinder 120.

As the torque generators rotate they apply substantially sinusoidal torques to the shafts 52, 54 and 56. The unidirectional clutches 130, 132 and 134 allow the shafts 52, 54 and 56 to rotate in only one direction. The generated torque is delivered through the gears 190 and 188, together with the other planetary gears corresponding to gear 188 to the sun gear 192 or to the ring gear 194 which then delivers a torque of the required sense to the output shaft 36.

When the cages 64, 66, 68, 70, 72, 74 are rotating at the same angular velocity as the shafts 52, 54, 56, the converter is said to be in synchronous drive.

In synchronous drive, for example, the weights of one generator 64 in a set of three may be extended in the direction of their eccentricity, and no torque is delivered by those weights to the shaft 52. But note that when no torque is delivered by generator 64, generators 66 and 68 are delivering equal, but opposite, torques to the shafts 54, 56 with a net torque of zero on shaft 36. As torque is needed, however, the weights advance or retard angularly to deliver substantially constant required torques to the shaft 36.

Optional brakes may be attached to the cages, selectively to stop their rotation. These brakes may be electrically, hydraulically, mechanically or pneumatically driven. One example of such a brake is shown in FIG. 2 for braking cage 62. Additional brakes would be attached to the other torque generator cages.

In FIG. 2, brake 55 is driven through linkage 57 by a hydraulic cylinder 59 having externally connected control leads 61.

Without such brakes, the cages of the torque generators would stop only at a specific speed of the output shaft 36 which matched the speed of the input shaft 22 through gears 38, 41, 40 and 24.

With the cages stopped, the transmission is said to be in direct drive or locked up. The drive is from the input shaft 22 through gears 24, 40, 41 and 38 as well as other planetary gears about the shaft 22 and corresponding to gears 40, 41.

Figure 13:
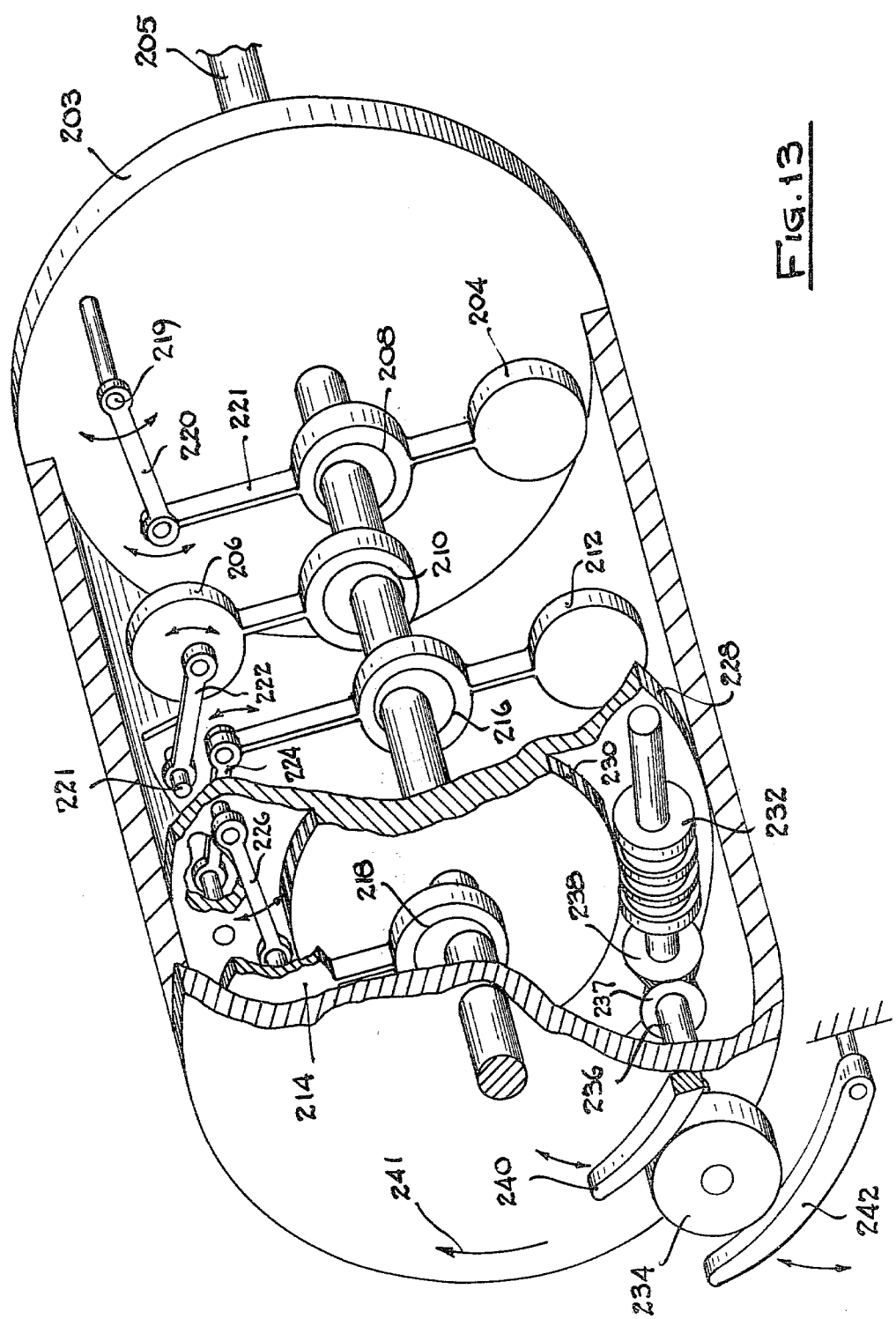
FIG. 13 is an oblique view, partly in section, of a second embodiment of the torque converter of this invention.

FIG. 13 is a view, partly in section, showing a second embodiment of a torque generator wherein two weight pairs are caged to a single rotatable cage structure, the weights of each pair being diametrically opposed, and having means for phasing the angular positions of one weight pair with respect to the other.

A cage 203 is mounted for free rotation upon a shaft 205. The first pair of eccentrically mounted weights 204 and 206 are mounted for free rotation relative to the eccentric bearing surfaces 208 and 210, respectively. The second pair of eccentrically mounted weights 212 and 214 are mounted for freedom of rotation upon the eccentric bearing surfaces 216 and 218, respectively. The axes of the eccentric bearing surfaces 208, 210, 216 and 218 are offset from the axis of the shaft 205 with the directions of eccentricity of bearings 208 and 216 in one direction and the direction of offset of bearings 210 and 218 in the diametrically opposite direction.

The weights 206 and 204 are constrained by linkages 220 and 222 to rotate with the cage 203. The weights 212 and 214 are constrained by the linkages 224 and 226 to rotate with the plate or frame 228. Plate 228 is mounted within the cage 203, and it is mounted freely on shaft 205 to be rotatably positioned about the axis of shaft 205 relative to the cage 203 by a worm gear 230 and a worm 232. The worm 232, in turn, is controlled by a hand wheel 234 attached to the worm 232 by a shaft 236 and a pair of gears 237 and 238.

The hand wheel 234 may be turned or adjusted upon each rotation of the cage 200 by friction contact with either the hand-actuated or servo actuated (not shown) friction member 240 or the member 242. Contact by member 240 causes wheel 234 to turn in a first direction as the cage 203 turns in the direction 241. Contact by member 242 causes wheel 234 to turn in the opposite or second direction.

The weights 204, 206, 212 and 214 move in a nearly radial direction constrained by a four bar linkage. The four bars of the linkages are the cage 203 to the axis of the shaft 205, the axis of the shaft 205 to the axis of the respective eccentric bearing 208, 210, 216 or 218, the axis of the respective bearing to its corresponding respective weight, and the linkages 220, 222, 224 or 226 to the cage 203. As the weights are moved by the turning cage 203 in an approximately tangential direction relative to the axis of the shaft 205, they also move radially relative to the axis of the shaft 205 due to the offset of the bearing surfaces 208, 210, 216 and 218. The motion of the weights 204, 206, 212, 214 are such that they undergo Coriolis acceleration and deceleration, during one rotation of the weights about their respective bearing axes. The effect of the non-productive motions is to superimpose a complex and undesirable oscillatory torque on the cage 203 and hence on the driving input shaft (connected to cage 203, but not shown). By linking the masses to the cage 203 through the arrangement shown in FIG. 13, opposing instantaneous torque patterns are generated by the masses of each pair of weights 204, 206 and 212, 214, such that the instantaneous torques delivered from the weights to the cage 203, and hence to the input shaft (not shown), almost disappears. Note that for each pair of weights one connecting link for each weight pair is mounted opposite in phase to the connecting link of the other weight. While one weight of each pair is accelerating the other is decelerating. Thus, the generated force which is delivered by each weight to the cage 203 approximately cancels the force generated by the other weight of that particular pair. Some radial imbalance occurs because the weights are not always absolutely diametrically opposed, because of different instantaneous velocities, and because of the slight relative angular misalignment caused by the finite length of links 220, 222, 224 and 226. To reduce the forces due to finite lengths of the connecting links, the links of each pair of weights are mounted to move in opposite tangential directions. Thus, the link 220 is mounted from pivot 219 right to left while the link 222 is mounted from pivot 221 left to right (going from the cage 203 to the respective weights). If the link 220, for example, were connected directly to the weight 204 instead of to the lever 221, the connecting pivot 219 would preferably be positioned to the left of the weight 204 so that the same ordered tangential direction of the link 220 would be maintained.

The operation of the torque generator of FIG. 13 is substantially the same as that described in connection with the torque generators of FIGS. 1 through 12. The cage 203 is driven in the direction of the arrow 241 by, for example, gear or shaft means (not shown) for free rotation about the axis of the shaft 205. The links 220, 222, 224 and 226 restrict the eccentrically mounted weights 204, 206, 212 and 214 to move with the cage 203. Because the axes of rotation of the weights are not the same as the axis of rotation of the cage, there is a radial component of motion of the weights relative to the axis of the shaft 205. The centrifugal forces or inertia of the rotating weights, acting through the lever arms between the axis of the shaft 205 and the eccentric axes of the bearings 208, 210, 216 and 218, respectively, apply torque to the shaft 205.

Figure 14:
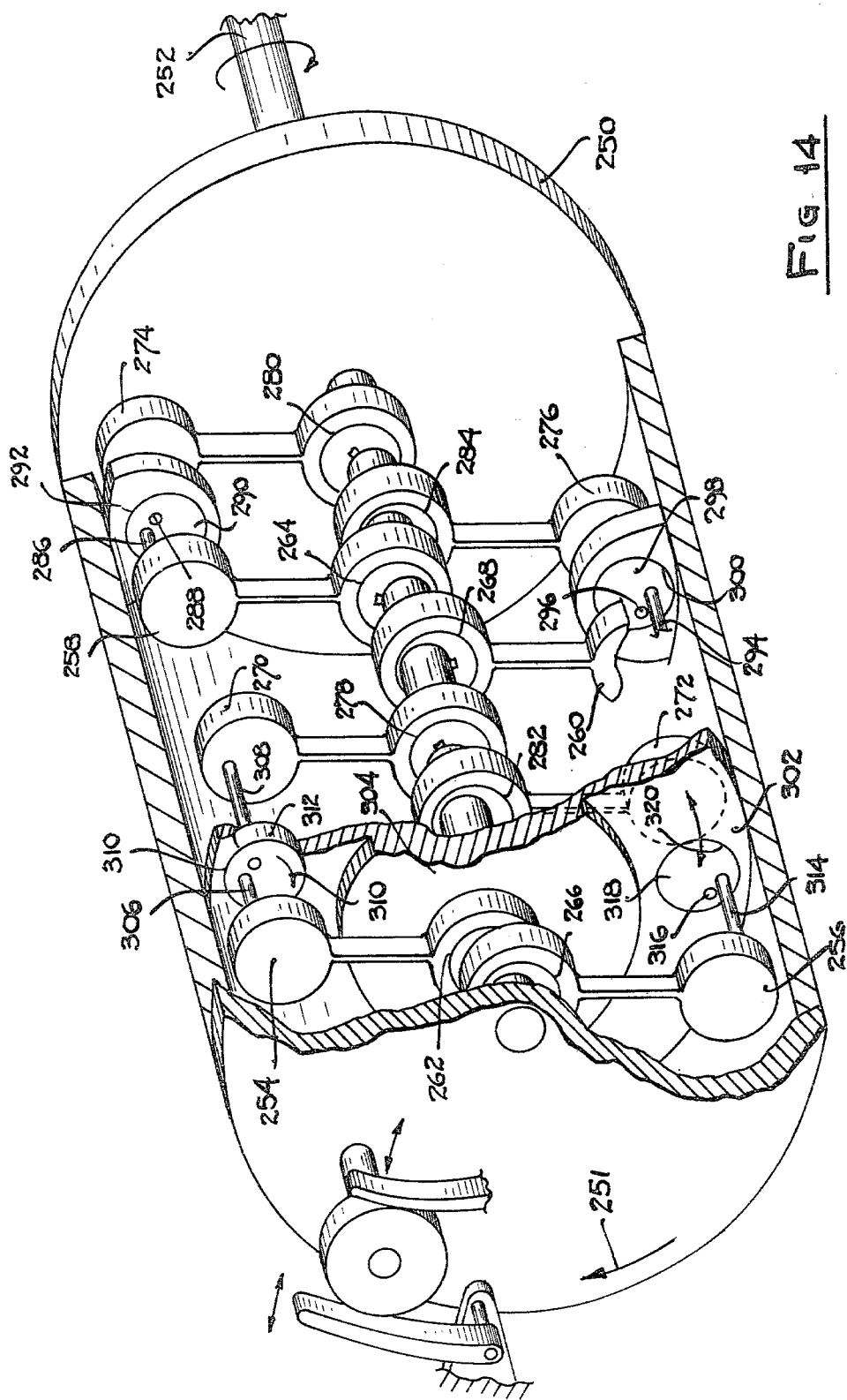
FIG. 14 is an oblique view, partly in section, of a third embodiment of the torque converter of this invention.

A third embodiment of the torque generator is shown in FIG. 14. Each torque generator of this embodiment has a cage 250 which is freely mounted for rotation about a shaft 252, and the cage 250 is driven in the direction indicated by the arrow 251 by means (not shown). The torque generator uses two quads of eccentrically mounted weights, each quad having two pairs of weights.

The first quad of weights comprises weights or masses 254, 256, 258 and 260. The bearing surfaces 262 of weight 254 and 264 of weight 258 are eccentrically mounted on the shaft 252 with a common eccentric axis. The bearing surfaces 266 of weight 256 and 268 of weight 260 are eccentrically mounted relative to the axis of shaft 252 in an opposite sense and equal amount to the offset of the eccentric axis of bearing surfaces 262 and 264.

The second quad of weights comprises eccentrically mounted weights 270, 272, 274 and 276. The weights 270 and 274 are mounted upon bearing surfaces 278 and 280 which are eccentrically mounted on a common axis offset from the shaft 252. The weights 272 and 276 are mounted upon bearing surfaces 282 and 284 which are coaxially mounted with their eccentric axes offset from the axis of shaft 252 in an opposite direction and equal amount to the offset of the eccentric axes of the bearing surfaces 278 and 280. The eccentric axes of the second quad of weights 270, 272, 274 and 276 are angularly positioned relative to the eccentric axes of the first quad of weights by a mechanism identical to gear 230, worm 232, gears 237, 238, shaft 236, hand wheel 234 and friction members 240, 242.

The weights 258 and 274 are restricted to move with the cage 250 by attaching them with axially directed freely rotatable pins 286, 288 to a follower 290 which rotates freely in the bearing 292 relative to the cage 250. Similarly, the masses 260 and 276 are connected by pins 294 and 296 to a follower 298 which is mounted upon bearing 300 for rotation relative to the cage 250.

A plate 302 having a gear 304 attached thereon is driven by a mechanism (not shown), including a worm gear, as shown in the embodiment of FIG. 13. The plate 302 is structured identically and positioned identically in the cage 250 as the plate 228 is positioned and structured in the cage 203 of FIG. 13.

The weights 254 and 270 are pinned by freely rotatable pins 306 and 308 which are axially directed and attached to follower 310 which is free to rotate relative to the plate 272 in a bearing 312. Similarly weights 256 and 272 are pinned by freely rotatable pins 314 and 316 to a follower 318 which is mounted for free rotation in bearing 320 relative to the plate 302.

Rotation of the plate 302 causes the torques applied by one pair of weights in each quad to be advanced in phase or retarded in phase relative to the torque supplied by the other pair of weights in that quad. Further, the amount of advance or retardation of phase is the same in each of the two quads.

The purpose of the second quad of weights in the embodiment in FIG. 14 is now explained. Each weight is constrained in a four bar linkage which is in the shape of a parallelogram. For example, the distance between the axis of the shaft 252 and the axis of the follower 290 is equal and parallel to the distance between the axis of the bearing 254 and the connecting pin 286. Further, the eccentricity or distance between the axis of the shaft 252 and the axis of the shaft 264 is equal and in the same direction as the distance between the axis of rotation of the follower 290 and the pin 286. That same relation occurs with each of the weights and their corresponding eccentric bearings and followers.

Note that when the cage 250 is rotating in the same direction and at the same angular velocity as the shaft 252, the weight 258 may be fully extended in its extreme radial position. The weight 260 would also be in its extreme radial position but 180 degrees out of phase with the weight 258. Small perturbations in the dynamics could cause the weight 258 and the weight 260 to move in either direction. That is, the position is unstable. It is desired to have the weights 258 and 260 move in the same angular direction to keep the sides of the four-bar linkages parallel, but because of the instability the weights could move in either direction. To prevent the motion in the wrong angular direction, the second quad of weights is introduced with their eccentric axes angularly displaced from the eccentric axes of the first quad so that when the weights of one quad are in their unstable position, the weights of the other quad are not in their unstable position, and the followers may only turn in one particular direction: the correct one. Further, note that the weights now rotate at a constant angular velocity thereby eliminating any tangential angular accelerations which would deliver a torque back to the cage and hence to the input shaft.

Figure 15:
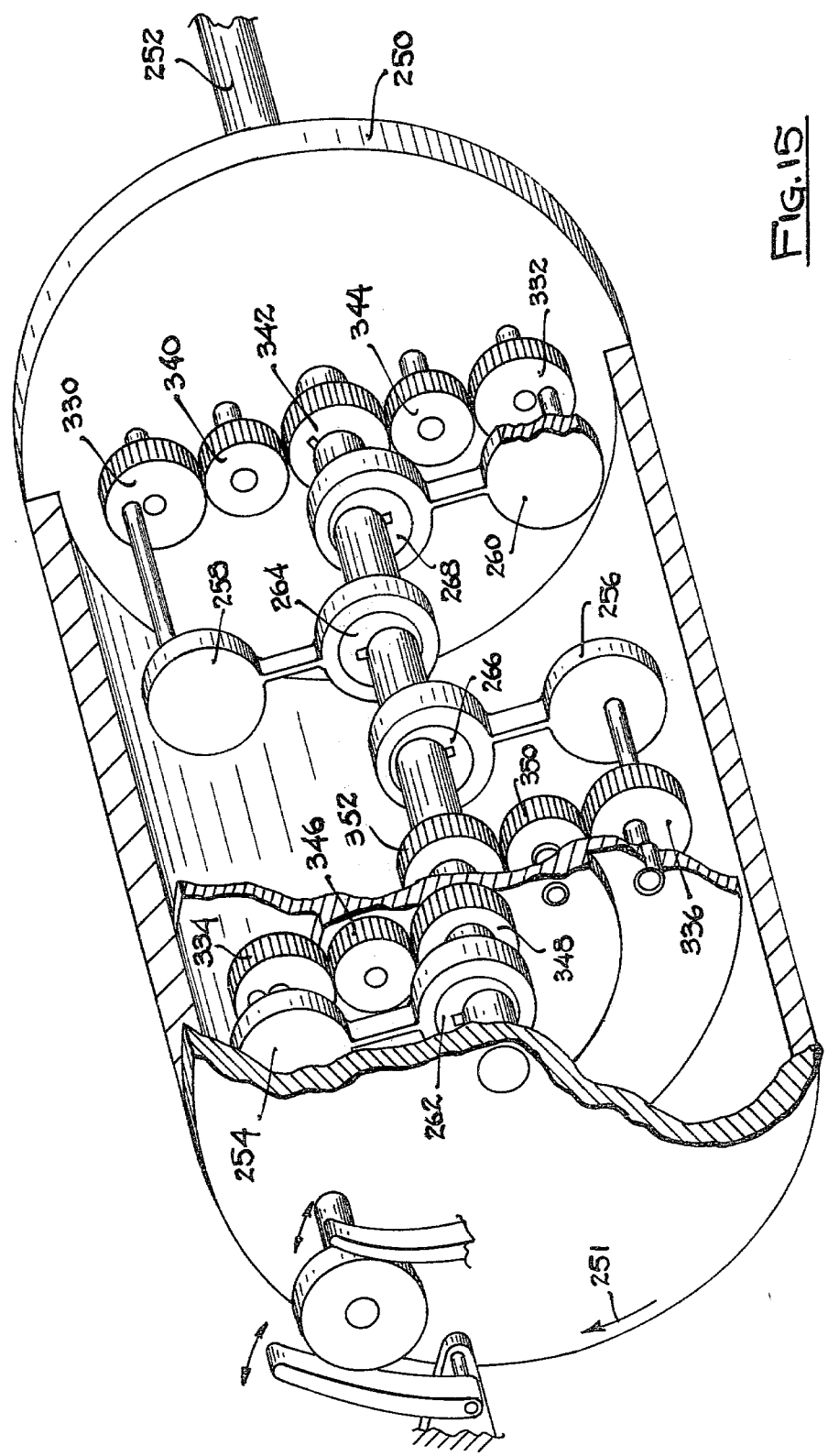
FIG. 15 is an oblique view, partly in section, of a fourth embodiment of the torque converter of this invention.

The embodiment of FIG. 15 obtains the desired effects of FIG. 14 with only one quad of weights. The unstable angular positions of the weights have been avoided in the embodiment of FIG. 15 by gearing the followers 330, 332, 334, 336 for free rotation relative to the cage 250. The follower 330 is geared to the shaft 252 through gears 340 and 342. The follower 332 is geared to the shaft 252 through the gears 344 and 342. The follower 334 is geared to the shaft 252 through the gears 346 and 348. The follower 336 is geared to the shaft 252 through the gears 350 and 352. The remaining elements of FIG. 15 are the same as for the first quad of FIG. 14. The idler gears 340, 344, 346, 350 are free to rotate relative to the cage 250. The follower gears 330, 332, 336, 334 must be the same size as their respective sun gears 342, 352, 348. Note that change of phase between weight pairs is achieved by mechanism shown and explained in connection with FIG. 13.

Figure 16:
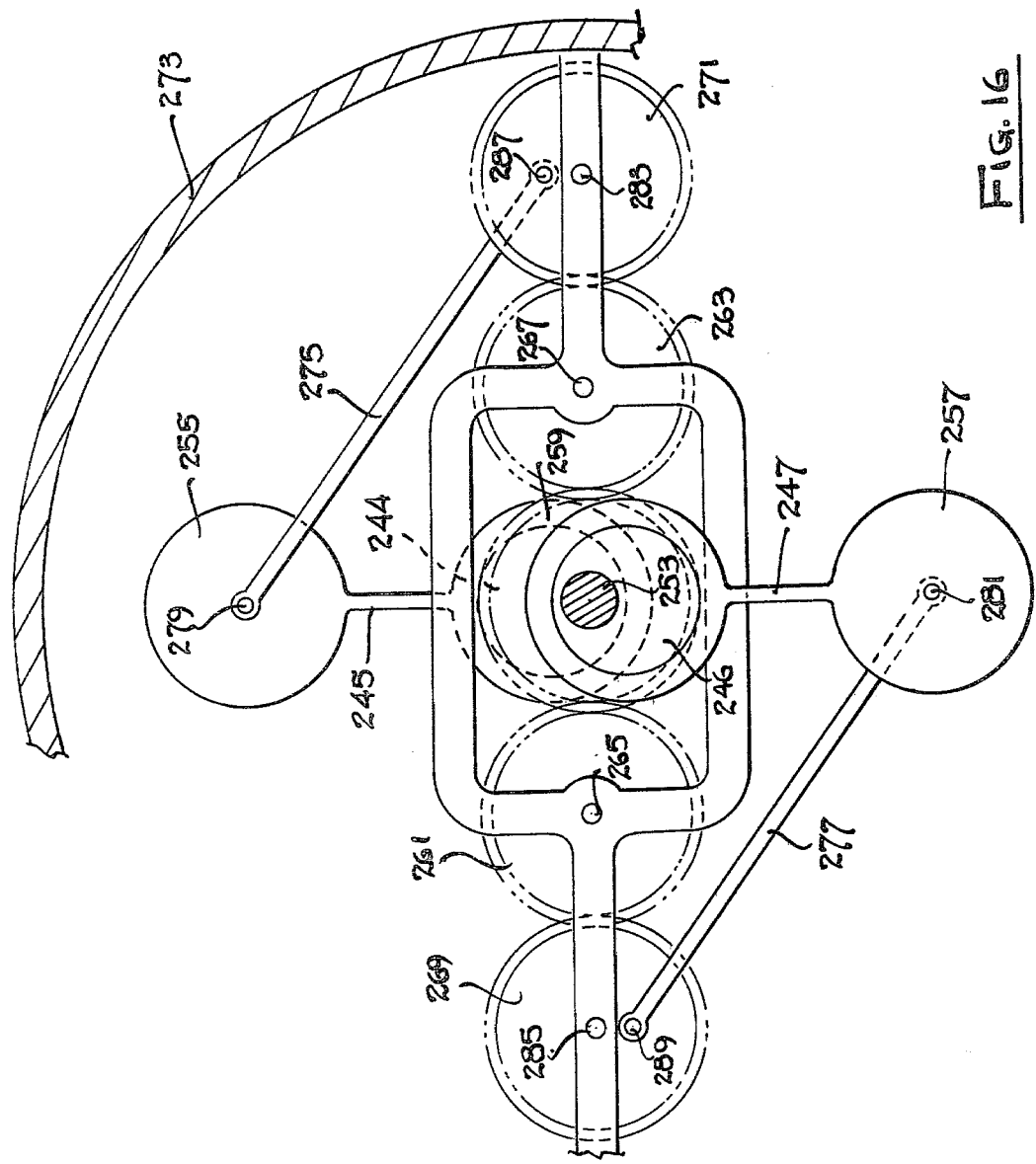
FIG. 16 is an oblique view, partly in section, of a fifth embodiment of the torque converter of this invention.

FIG. 16 shows an alternative to the embodiment of FIG. 15. The rotable cage 273 is symetrically positioned about the axis of the shaft 253. One or more pairs of weights 255 and 257 are eccentrically mounted relative to the axis of the shaft 253. A sun gear 259 is mounted upon shaft 253 to rotate therewith. The gear 259 drives idler gears 261 and 263 which rotate about axes parallel to the axis of shaft 253 upon axles 265 and 267. The idler gears 263 and 265 drive gears 269, 271 which rotate about axes parallel to the axis of shaft 253 upon axles 283 and 285, respectively. Axles 285, 265, 267, and 283 are attached to the cage 273 to turn about the axis of shaft 253 with cage 273.

A link 275 is pinned by pin 279 to the weight 255, and rotation is allowed between the pin 279 and the link 275. The link 275 is also pinned to the gear 271 by the pin 287 which is offset from the axis of rotation of the gear 271 by an amount and direction equal to the offset of the axis of rotation of weight 255 from the axis of shaft 253. Rotation of the link 275 about the pin 287 is allowed.

Similarly linked 277 is pinned to the weight 257 at pin 281 with rotation between the link 277 and pin 281 allowed. The link 277 is also pinned by pin 289 to the gear 269, and the pin 289 is offset from the axis of rotation of gear 269 by an amount and direction equal to the offset of the axis of rotation of weight or mass 257 from the axis of rotation of shaft 253.

Operation of the mechanism of FIG. 16 may best be described by considering the shaft 253 to be rotating while the cage 273 and axles 285, 265, 267, and 283 are standing still. Under those circumstances, gear 259 is driven by shaft 253 which in turn drives gears 261 and 263. The gear 271 and pin 287 rotated about the axle 283. The axis of bearing 244 also rotates about the axis of shaft 253 at a radius in the same direction and distance as the pin 287. The pin 279 and weight 255 follow a translation in the same small circle as the pin 287 and the axis of bearing 244.

An additional set of weights and gears may be attached to an auxiliary frame whose phase is adjustable relative to the cage. The phasing may occur through a mechanism as shown, for example, in FIG. 14. Another phasing technique for the system of FIG. 16 is to use the two-cage system of FIGS. 1–12.

Figure 17:
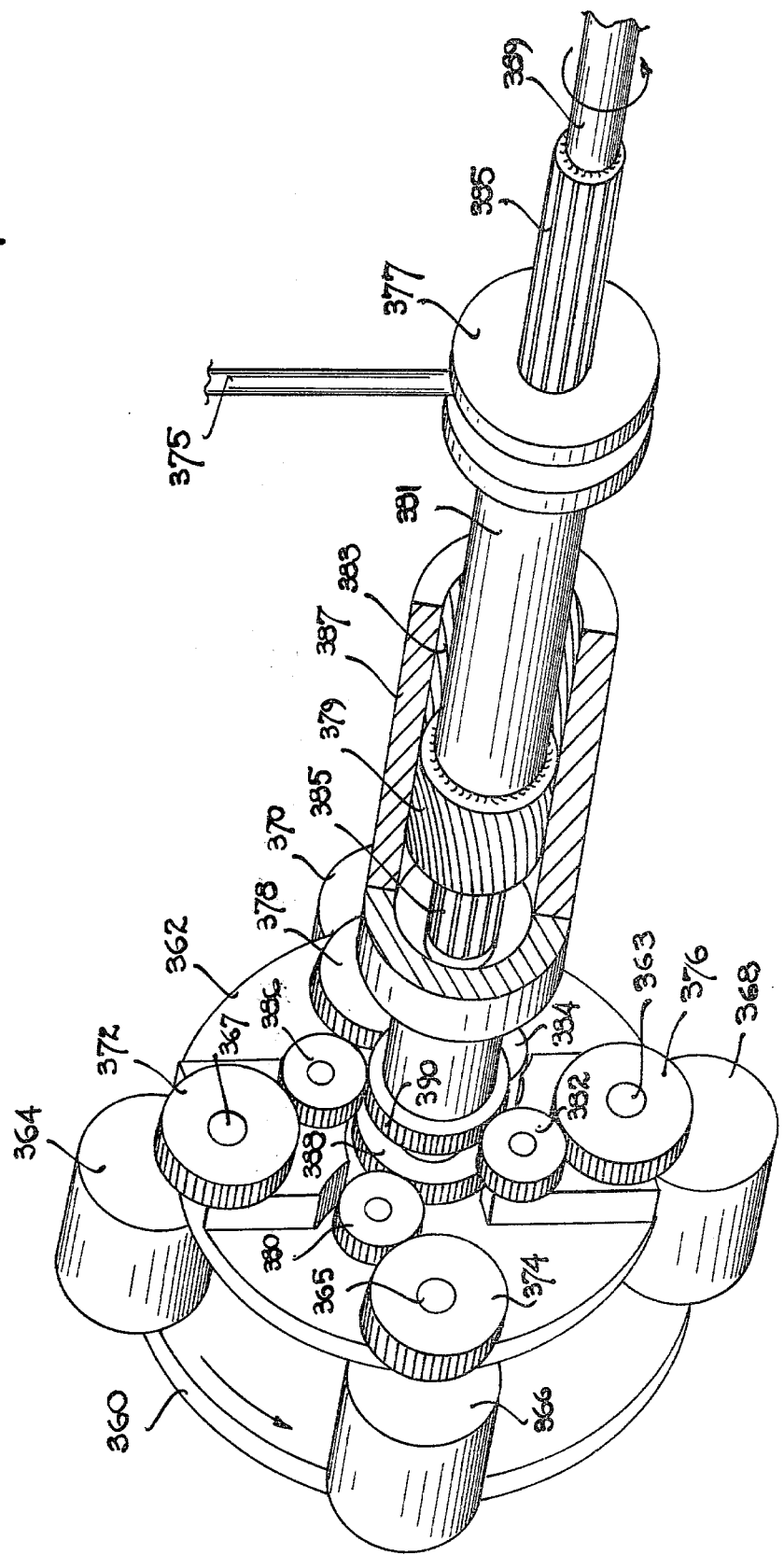
FIG. 17 is an oblique view partly in section, of a sixth embodiment of the torque converter of this invention, together with means for phasing the relative positions of the torque generator weights.

An alternative embodiment of the weight configuration is shown in FIG. 17, wherein the input shaft (not shown) drives a cage 360 which in turn drives a cage 362 by means of four shafts, 363, 365, 367 and a fourth shaft (not shown) diametrically opposite shaft 365. Shafts 363, 365 and 367 and the fourth shaft are free to rotate about their own axes relative to the cages 360 and 362. Eccentrically mounted weights 364, 366, 368 and 370 are mounted for rotation with the shafts 364, 366, 368 and the fourth shaft, respectively. As the weights 364, 366, 368 and 370 rotate about the axes of shafts 367, 365, 363 and the fourth shaft, they apply oscillatory tangential forces to the cage 362. Gears 372, 374, 376 and 378 are mounted upon the shafts 367, 365, 363 and the fourth shaft for rotation therewith, and they engage idler gears 380, 382, 384 and 386 which are freely rotatable relative to the cage 362. Idler gears 380, and 384 engage sun gear 388 which is rotatable with the output shaft 389. Gears 382 and 386 engage gear 390 which is rotatable with the sleeve 387. The outside of the shaft 389 in the region of the sleeve 387 has straight splines 385 thereon. The inside of the sleeve 387 has spiral splines 383 thereon. A sleeve 381 having straight splines on the interior thereof and spiral splines 379 on the exterior thereof engages both the exterior splines 385 and the interior splines 383. The sleeve 381 has attached to one end thereof a spool 377 which is adapted to be moved by member 375 which may be a fork as described in connection with FIG. 1. As the member 381 is moved inward and outward, the angular position of the weights 364 and 368 relative to the angular position of weights 366 and 370 is modified. Operation of the apparatus of FIG. 17 is explained below in connection with FIG. 22.

In the embodiment of FIG. 1 torque is delivered from shaft 22 to shaft 36 through the gear 24, the gear 28, the gear 26, the satellite gears for gear 26, and the torque generators 64, 66, 68 to the shaft 52, thence through gear 190, the satellite gears 180 and 182, the gear 188 and either gear 192 or 194, to the shaft 196. Torque is also delivered through the shafts associated with the other torque generators of the apparatus. Torque may be shunted around the torque generators and their respective shafts by delivering the torque from gear 24 through gear 40 to gear 41, thence to gear 48 directly to the shaft 36. Thus, the torque paths are split. Splitting of the torque paths allows the torque load carried by the torque generators to reduce as the output shaft 36 speed increases. Substantially all of the power flows through the torque generating trains 52, 54 and 56 when the output shaft 36 is nearly stopped. As the output shaft 36 speed increases, more of the power flows directly through the gear 38 to the shaft 36. The distribution of power for a given output shaft to input shaft speed ratio depends on the gear ratio between the gear 24 and the gear 40 as well as the ratio between gear 41 and the gear 38.

Figure 18:
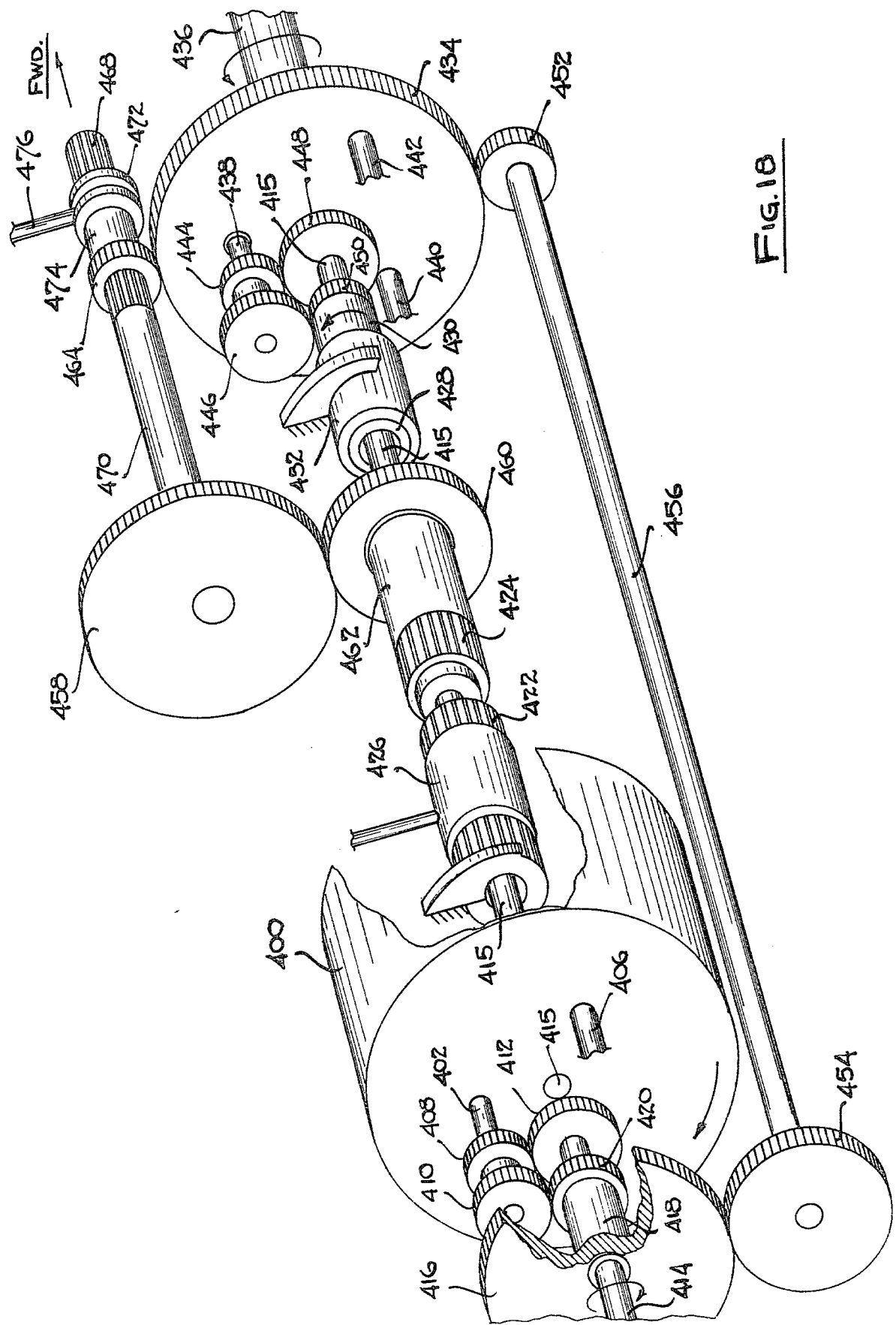
FIG. 18 shows a reversing gear train, together with a direct drive, connected to a torque converter.

It is instructive to introduce an alternative gear embodiment, shown in FIG. 18, having two torque paths. The embodiment of FIG. 18 is typical for an arrangement for an input shaft driven by a combustion engine where, to minimize the eccentrically mounted weight sizes, the torque generator cage is spun faster than the engine shaft. If the input power came from a high speed source such as a gas turbine, a planetary gear arrangement of the form shown in FIG. 19 could be used. The embodiment of FIG. 19 allows the torque generating cage to spin slower than the input shaft while still slowing the torque generator cage rotation speed as the output shaft speed increases.

In the embodiment of FIG. 18, a torque generator 400 is connected through spindles 402, 406 and third spindle (not shown) to three sets of double planetary gears. Only one set of the double planetary gears comprising a pair of gears 408, 410 are shown mounted upon the spindle 402. No gears are shown on the spindle 406 nor the third spindle which would be 120 degrees from 402, 406 about the axis of shaft 414. The gear 408 and the corresponding gears on spindle 406 and the unshown spindles engage a sun gear 412 which is attached to the input shaft 414. Freely rotatable upon shaft 414 is a gear 416 which has a sleeve 418 connecting it to a sun gear 420 which engages gear 410 and the two corresponding gears which are rotatable on the spindle 406 and the third unshown spindle.

In the shown embodiment, three spindles 402, 406, and a third spindle are angular displaced 120 degrees apart at the same radius. The choice of three spindles and gear pairs is arbitrary and convenient. For example four, six or any number of spindles which will fit can be used.

An externally splined sleeve 422 is held stationary. The shaft 415 is rotatable within the stationary sleeve 422. A second externally splined sleeve 424 is adapted to be rotatable relative to the shaft 415. A splined sleeve 426 is adapted to be moved axially along the shaft 415 to connect the splines of the sleeves 422 and 424 at the option of the operator. The inner race 428 of a unidirectional clutch is attached to rotate with sleeve 430. The outer race 432 of the clutch is connected to the outer frame and does not rotate.

Gear 434 is attached to rotate with the output shaft 436, and it carries three spindles 438, 440 and 442 each of which carries a double planetary gear although the planetary gears on spindles 440 and 442 are not shown. One of the double planetary gear sets 444 and 446 is shown with the gear 444 engaging the sun gear 448 which is on the end of shaft 415. The gear 444 and the corresponding planetary gears on spindles 442 and 440 engage the gear 448. The gear 446 and corresponding planetary gears on spindles 440 and 442 engage the gear 450 on the sleeve 430. Output gear 434 is directly connected in a shunt torque path to the input gear 416 through a pair of gears 452, 454 and a drive shaft 456.

A gear 458 engages the gear 460 which is on the outer race of a free running clutch 462. The inner race of the free running clutch 462 is on the drive shaft 415. A gear 464 rides on the outside splines 468 of the shaft 470 which connects to the gear 458. The gear 464 is adapted to be moved by spool 472 and the connecting sleeve 474 in response to motions of the element 476, which may be a fork-like element, to engage and disengage the gear 464. Thus, in one of its two positions the gear 464 and the gear 458 turn in synchronism with the gears 434 and 460 while in the other position the gear 458 merely floats on the gear 460, and the outer race of bearing 462 is grounded.

With splines 422 and 424 locked together, the clutch 462 allows the input shaft 414 to turn in only one direction. Further, the clutch 432 allows the output shaft 436 to turn in only one direction.

With the spline 424 disengaged from the spline 422 and the gears 464 and 434 engaged, transmission of torque through the clutch 462 depends on the relative velocities of the output and input shaft. When the output shaft is turning at a velocity substantially faster than the input shaft, no torque is delivered to the output shaft. Further, the engagement of gear 464 with gear 434 together with the operation of gears 460 and 458 allows the output shaft 436 to be driven directly by the shaft 415 in the reverse direction from the input shaft 414.

When the output shaft 436 is stopped, so too are gears 434, 458, 454, 416 and 420. When the input shaft 414 is turned, gear 412 is also turned causing planetary gears 408 (and an additional two gears on the other spindles 120° from gear 408) to turn. Gears 410 (and the other two corresponding planetary gears) also turn and roll around the stationary gear 420, carrying the spindles 402, 406 and a third spindle with them. This turns the torque converter cage 400, generating torque on the torque converter output shaft 415.

When the output shaft 436 is turning, the gear 420 also turns, and rotation of the input shaft 414 and gear 412 causes the input power to split with some of the power being transmitted through shaft 456 and the remaining input power being delivered to the cage 400.

Figure 19:
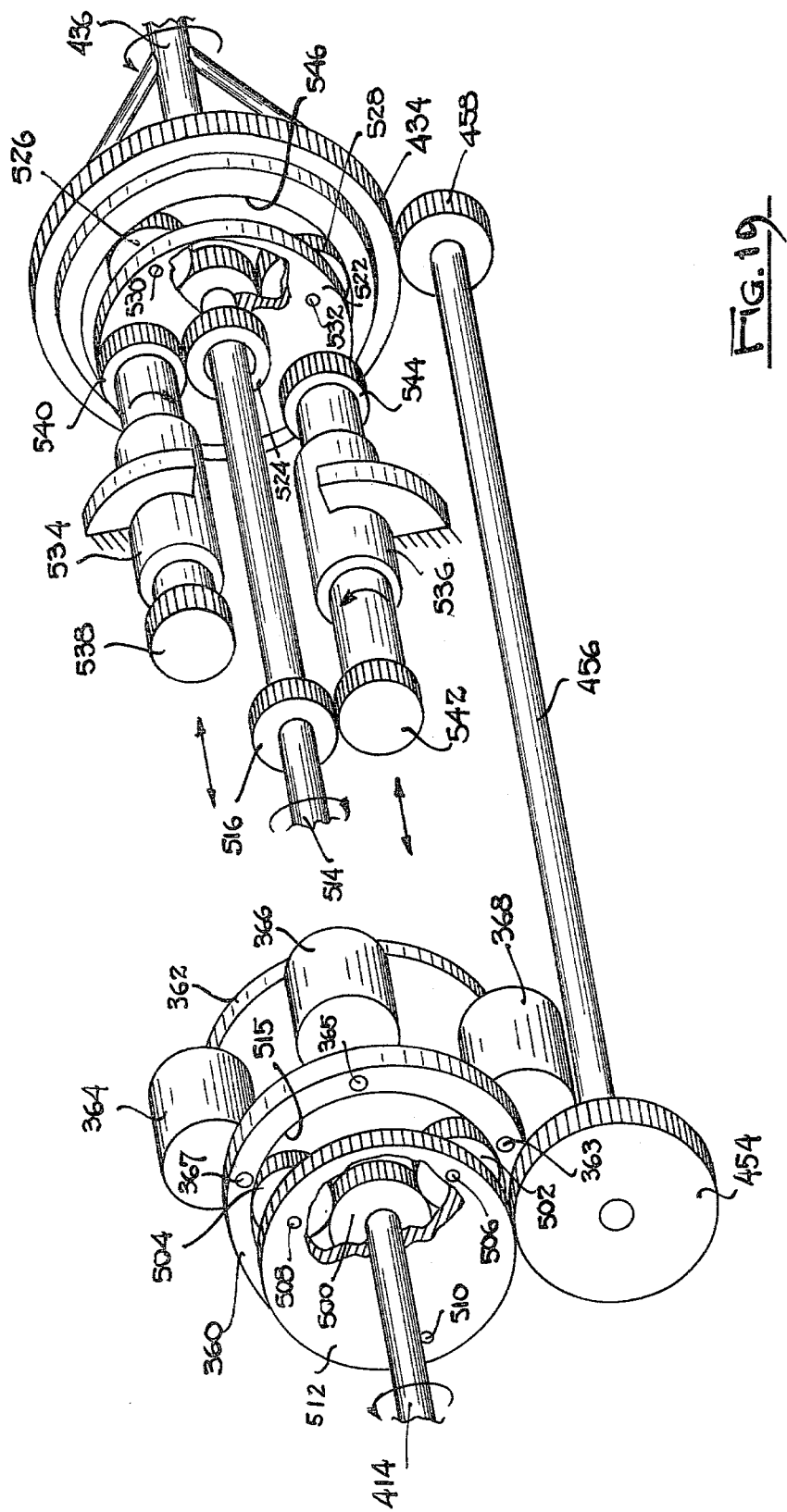
FIG. 19 is an alternative embodiment of the gear train of FIG. 18.

FIG. 19 shows a torque converter of the type described above in connection with FIG. 17. The input gearing, however, is configured to accommodate a high velocity input on the input shaft 414 while delivering a relatively slow velocity to the output shaft 436. The torque converter may be as shown in FIG. 17 and in FIG. 19 or it may be other embodiments described in this specification. Portions of the torque converter connection shown in FIG. 17 are omitted from FIG. 19.

In FIG. 19, the input shaft 414 drives a sun gear 500. Three planetary gears ride upon the sun gear 500. The planetary gears are positioned symmetrically about the axis of shaft 414. Instead of three gears, other numbers of gears such as four or two could be used, if desired. Two of the planetary gears are shown at 502 and 504. The planetary gears 502, 504, and the third gear rotate freely on spindles 506, 508, 510 which are attached to the gear 512. The gear 512 is mounted for free rotation on the shaft 414, and it meshes with gear 454 which drives shaft 456 and gear 458. Gear 458 meshes with gear 434 which is attached to the output shaft 436.

The cage 360 has an internal gear 515 which meshes with the planetary gears 502, 504 and a third planetary gear (not shown) to drive the cage 360 at a slower speed than the input shaft.

Figure 20:
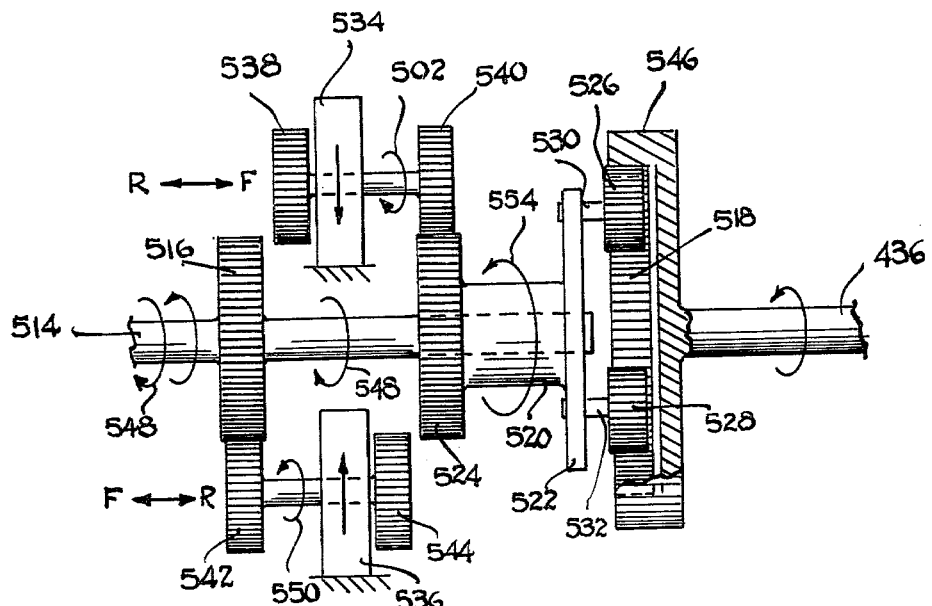
FIG. 20 is an enlarged view of the means of FIG. 19 for reversing the torque between the input and output shafts.

The reversing mechanism of FIG. 19 is shown in profile in FIG. 20, and it will be found easier to follow the explanation by referring to FIG. 20.

The mechanism of FIG. 20 is shown in the defined forward direction wherein the output shaft 436 follows the direction of the input shaft 414 but opposite to the direction of the torque generator shaft 514.

The torque generator shaft 514 carries two gears, gear 516 and sun gear 518. A sleeve 520 and plate 522 freely turn on the shaft 514. A gear 524 is attached to rotate with sleeve 522. Three planetary gears 526, 528 and a third gear (not shown) are symmetrically positioned around and engage the sun gear 518. The three planetary gears are mounted for free rotation upon three spindles 530, 532 and a third spindle (not shown). The spindles are attached to plate 522.

A pair of unidirectional clutches 534, 536 have their outer races grounded, and they are unidirectional in opposite directions.

A pair of gears 538 and 540 are attached to the inner race of clutch 534. A pair of gears 542, 544 are attached to the inner race of clutch 536. To make the output shaft 436 turn in the forward direction, gear 540 engages gear 524, and gear 542 engages gear 516. Gears 538 and 544 are disconnected. To make the output shaft 436 turn in the reverse direction, gear 538 is connected to gear 516, and gear 544 is connected to gear 524 with gears 542 and 540 disconnected.

The output shaft 436 is attached to a gear 546 which has internal teeth engaging the planetary gears 526, 528 and a third gear (not shown).

With the gears in the position shown in FIG. 20, the output shaft 436 turns in the same direction as the input shaft 414 and opposite to the torque generator shaft 514. Consider the shaft 514 turning in the direction of arrow 548. Gear 542 turns in the direction shown by arrow 550 which is the allowed direction of clutch 536. Clutch 534 will only allow gear 540 to turn in the direction shown by arrow 552. Hence gear 524 and plate 522 can only turn in the direction of arrow 554 or stand still. When plate 522 stands still, rotation of gear 518 in the direction of arrow 548 causes internal gear 546 and shaft 436 to turn in the opposite direction from shaft 514.

With gears 538 and 544 meshing with gears 516 and 524, respectively, the output shaft turns in the opposite direction to the input shaft 414 and in the same direction as the torque generator shaft 514. Consider the shaft 514 attempting to turn in the direction of arrow 548. Gear 538 can only turn in the direction of arrow 552, and clutch 534, through gear 538, which prevents shaft 514 from turning in the direction of arrow 548. Hence shaft 514 is only allowed to turn in the direction opposite to arrow 548. Clutch 536 will only allow gear 544 to turn in the direction of arrow 550. Hence gear 524 and plate 522 can only turn in the direction opposite to arrow 554 or stand still. When plate 522 stands still, rotation of gear 518 opposite to arrow 548 causes internal gear 546 and shaft 436 to turn in the opposite direction from shaft 514 and opposite to the direction of input shaft 414.

Figure 21:
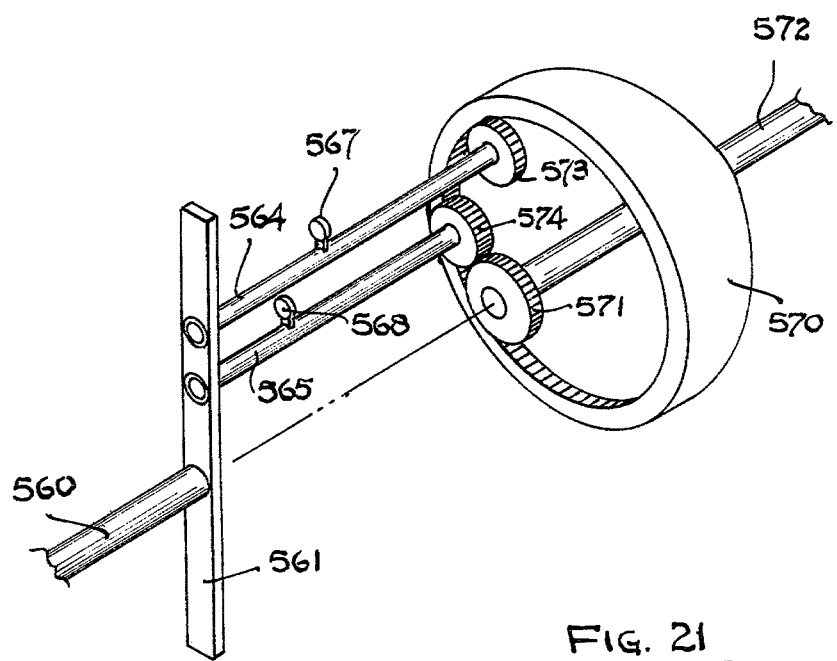
FIG. 21 is a diagram of a seventh embodiment of the torque converter of this invention.

FIG. 21 is a schematic diagram of a rudimentary torque converter. In FIG. 21, an input shaft 560 drives a cage member 561. A pair of eccentrically balanced shafts 564, 565, with the eccentricity schematically shown by the offset weights 567, 568 are attached to the cage 561 to rotate therewith. An internal gear 570 and a sun gear 571 are rigidly attached to the output shaft 572.

A gear 573 on the end of shaft 564 mates with the internal gear 570. A planetary gear 574 on the end of shaft 565 mates with the sun gear 571. Clockwise rotation of shaft 560 causes gear 573 to roll over the internal gear 570, causing the shaft 564 to rotate in a counter clockwise direction. It also causes gear 574 to roll over gear 571, causing the shaft 565 to rotate in a clockwise direction. The velocities of the shafts 564 and their directions depend upon the velocity and direction of rotation of shaft 572, but in each event the shafts 564 and 565 rotate in opposite directions. The unbalanced weights 567, 568 produce torque on the shafts 564, 565. The unbalanced weights 567, 568 also produce torque on the input shaft 560, but since the weights are rotating in opposite directions, those torques cancel if the eccentricity and/or size of the two masses are carefully matched. When the gears 573 and 574 are very small relative to the gears 570 and 571, the opposing weights 567, 568 can have almost exactly the same eccentricity, cage axis to planet axis distance, and weight, and only a very slight torque is delivered back to the input axis 560.

Figure 22:
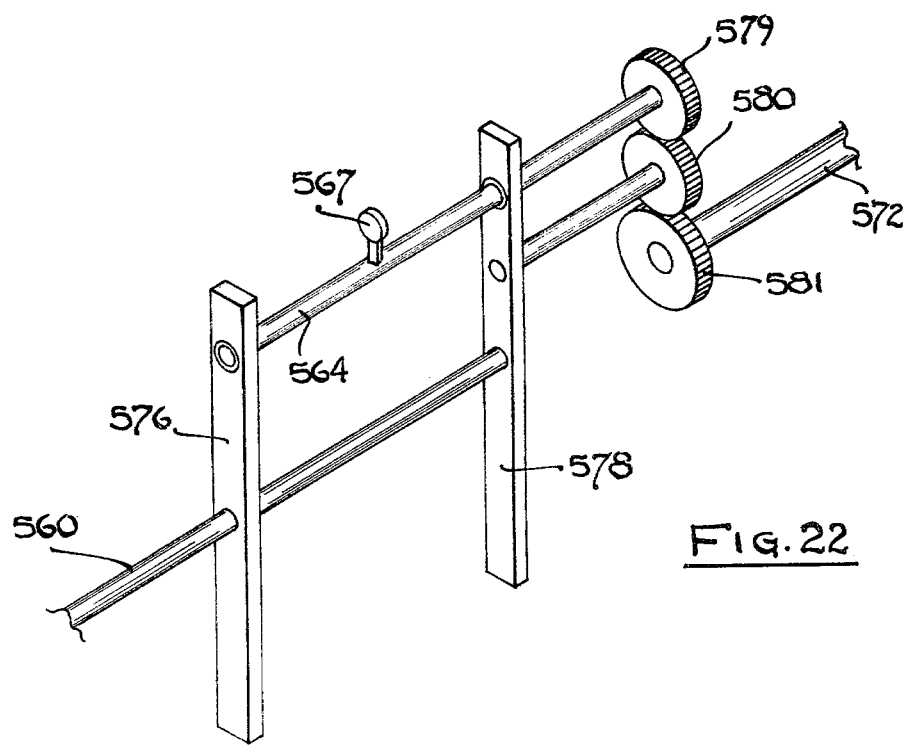
FIG. 22 is a diagram of an eighth embodiment of the torque converter of this invention.

The torque converter of FIG. 22 is a variation of FIG. 21, and it is shown in its useable form in FIGS. 17 and 19. The input shaft 560 rotates two cages 576 and 578. Shaft 564 rotates relative to the cages 576, 578. The shaft 564 carries an eccentrically mounted weight 567 and a gear 579. An idler gear 580 rotates relative to the cage 578 and engages gear 579 and the gear 581 on the output shaft 572. The gears 579 and 581 are the same size.

In the embodiment of FIG. 22, an oscillatory torque is delivered when the weight 567 rotates about the axis of shaft 564. The reaction torque, however, does not return to the input shaft 560 because the gear 580 delivers to the cage 578 a torque, due to the rotation about the axis of shaft 560, which is equal and opposite to the torque delivered directly to cage 576 from shaft 564. Consider when the output shaft 572 is stopped, the weight 567 would follow a circular path about the axis of shaft 560 while keeping its direction relative to the axis of shaft 564 constant. That is, weight 567 would stay in position, for example, upward, or to the right, or some other position. The absolute angular velocity of the weight 567 about the axis of shaft 564 is then zero.

A practical transmission has a certain amount of compliance in the output drive train. The compliance spring 575 (FIG. 23) in series with the clutch 577 between the input shaft 560 and the output shaft 572 represents that compliance. Compliance is important because it acts as an energy storage mechanism that can greatly affect the output torque. The effects of the compliance are much greater at low output speeds, and it has the maximum influence when the output shaft is stopped. When the output shaft is stopped, the output torque increases by approximately three times over a system without compliance. The torque increase is the difference between the value of the integrated half-wave of torque and that of the peak torque. The increase occurs because the one-way clutch 577 allows the compliance 575 to wind up, but it does not allow the compliance to unwind unless the output shaft 572 moves forward. The degree of windup of the compliance 575 is a direct function of the peak torque on the compliance. The windup peaks at the maximum torque point. The degree of compliance affects how fast the torque level reduces as the output speed increases from zero.

Alternatively, the compliance may be connected between the clutch and the housing.

In the embodiment of FIGS. 17, 19, 21, 22, the rotational inertia of the torque generator shaft and its direct attachments, and the rotational inertia of components, including the weights, connected through gears to the torque generator shaft but scaled to the gear ratios have a predominate effect on the output torque-velocity relation at higher output speeds. In the embodiments of FIGS. 1 through 16, the effect of the torque generator weights is not scaled through a constant gear ratio but rather through a complex function of a number of variables including, but not limited to, relative position, relative angular velocity, and geometric factors. At low output speeds, the torque-velocity relation is controlled by the compliance downstream of the clutch. There is a significant overlapping speed region.

Figure 23:
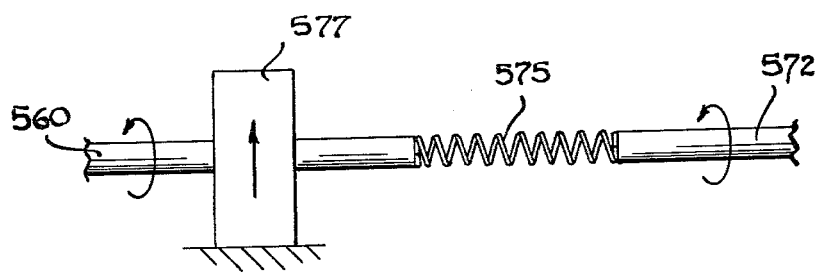
FIG. 23 is a diagram for demonstrating the effect of a spring in the drive of this invention.
Figure 24:
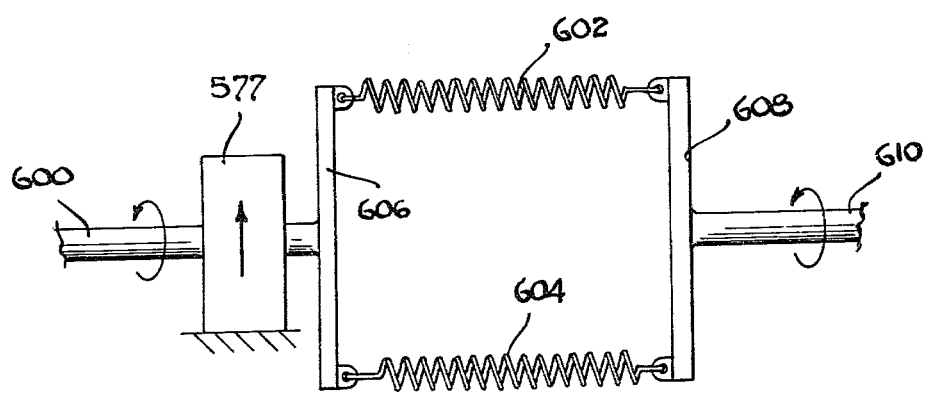
FIG. 24 is a diagram of a typical non-linear spring combination.

For applications where simplicity of design or low weight are needed, a further variation is available. The output planetary gear and clutch system (for example, FIG. 20) is replaced by a non-linear spring. A schematic diagram of a typical non-linear spring is shown in FIG. 24. Parallel springs 602, 604 are connected between cage 606 on the input shaft 600 and cage 608 on the output shaft 610. The cage output torque, applied to the input shaft 600, winds the non-linear spring system in a forward direction, but it is caught by the one-way clutch 577 when it tries to unwind. The spring acts like a stiff spring at low output speeds and a soft spring at high output speeds. At low output speeds the torque generated is high and short stroked, and a stiff spring is desired. At low torque levels and long pulse lengths, a soft spring is desired. It has been found that a spring system having a spring constant proportional to the cube of the angular displacement is desired. The spring system of FIG. 23 is such a system for displacements under forty-five degrees.

Figure 25:
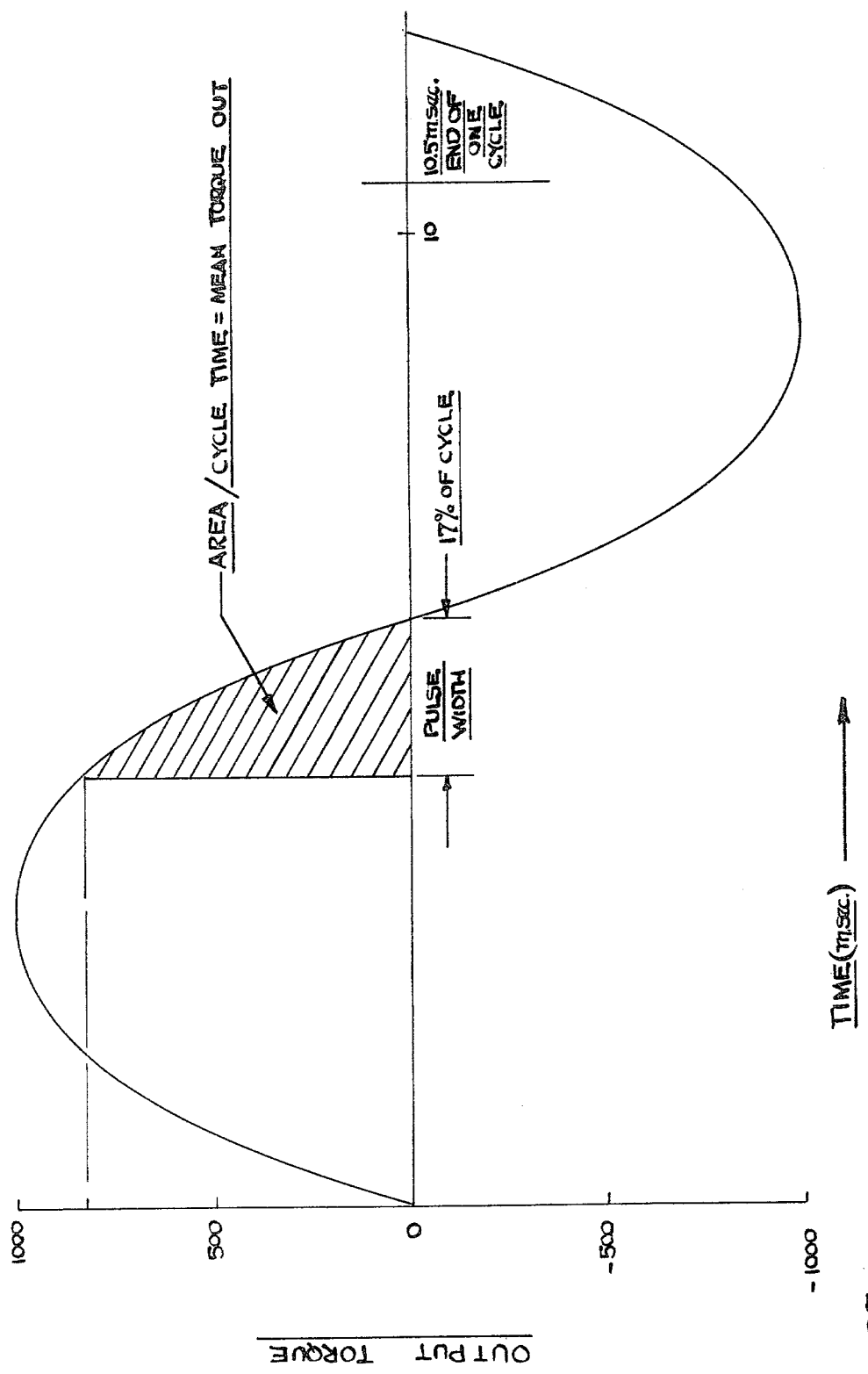
FIG. 25 is a graph of the duty cycle of a uni-directional clutch.

It must be noted that the unidirectional clutches do not transmit torque for a full half cycle of a cyclically applied torque, but a finite time is required to reverse the clutch. The delivered torque, therefore, is in pulses as shown, for example, in FIG. 25. In FIG. 25, the torque transmissions cycle has pulse width of 17% of the cycle.

Figure 26:
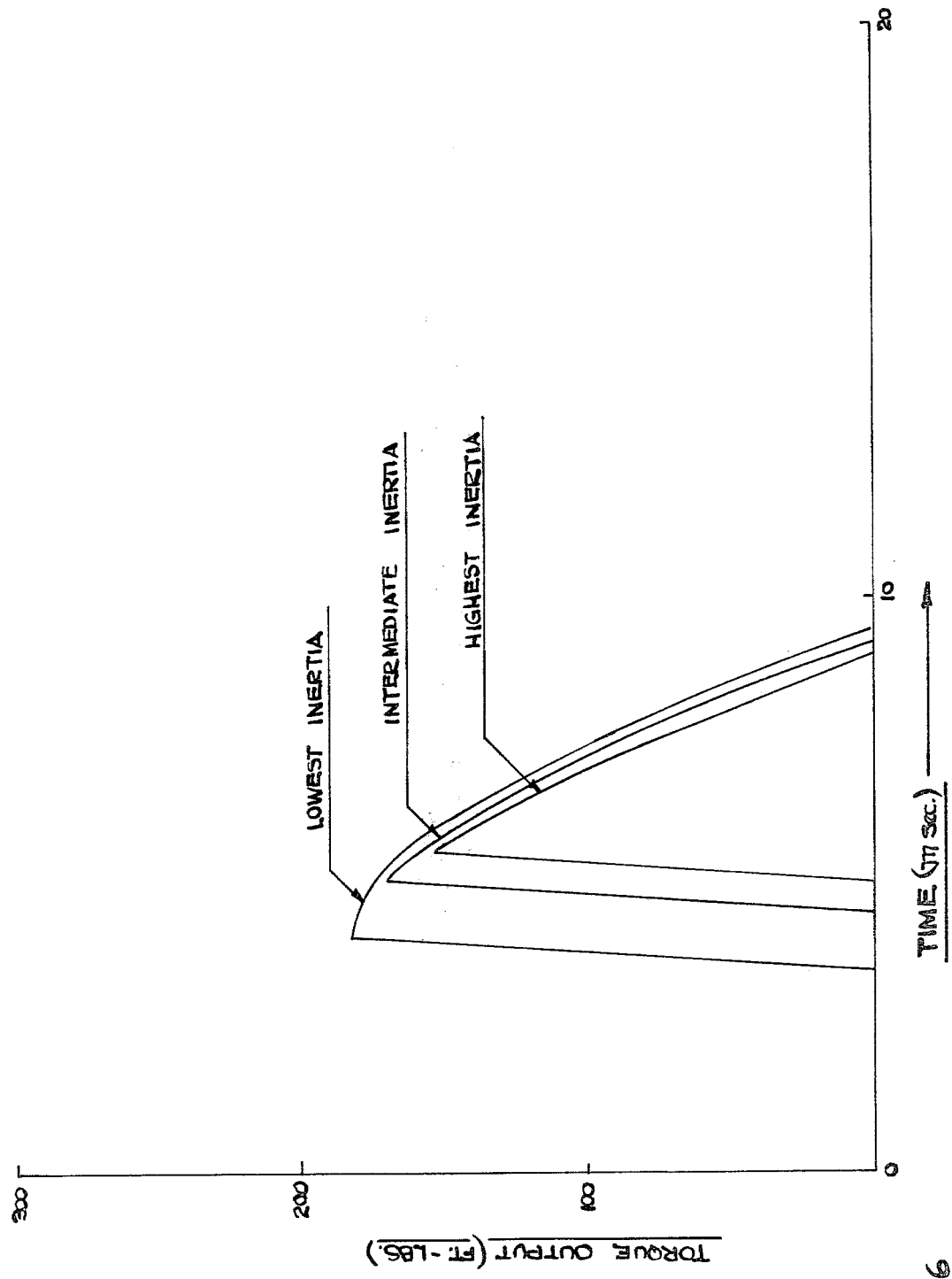
FIG. 26 is a graph of delivered torque as a function of the inertia of the system.

The actual pulse width, as shown in FIG. 26, also depends upon the inertia of the system. As the inertia increases, the pulse width decreases. The time scale is inserted for example only.

Figure 27:
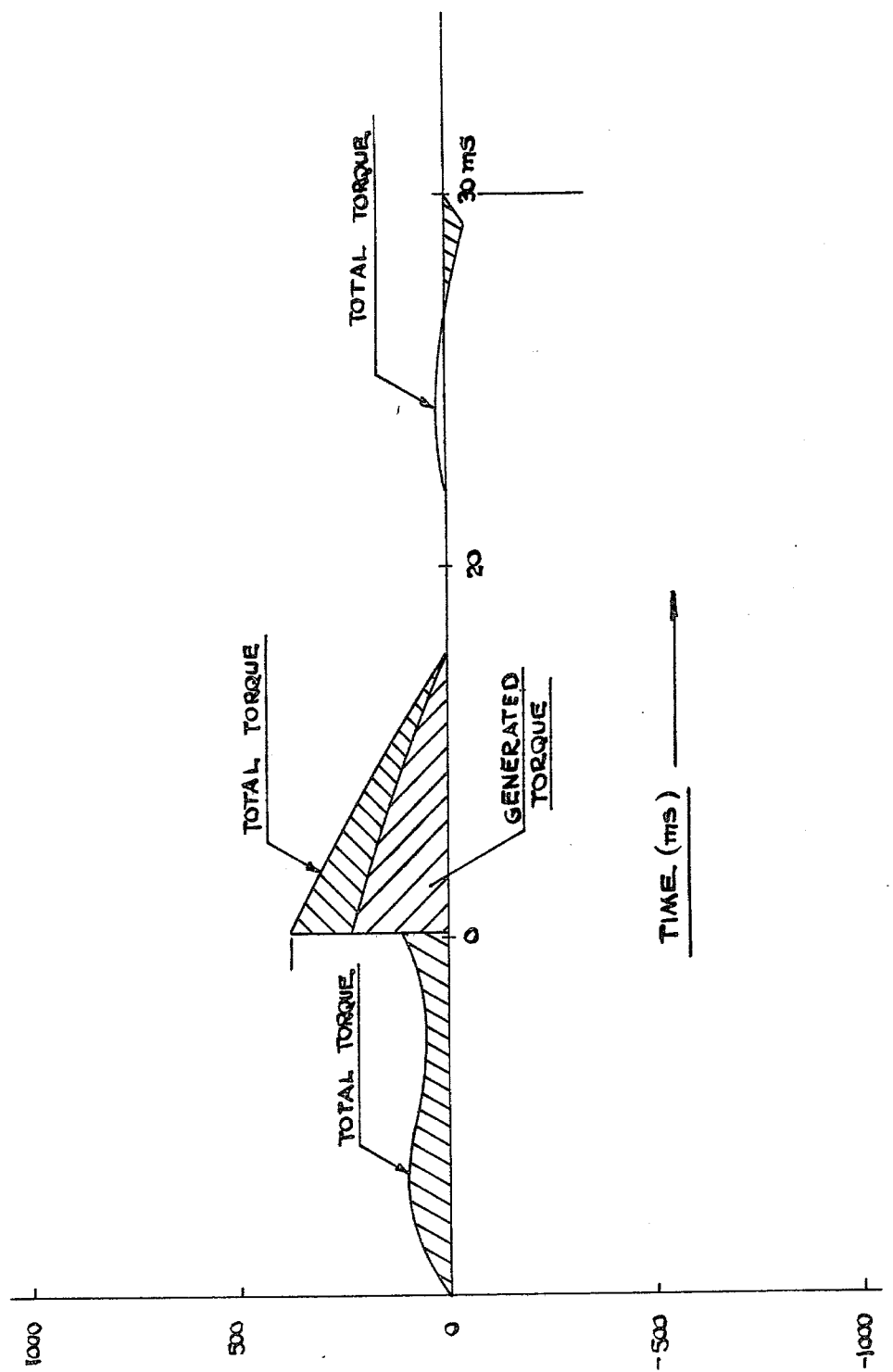
FIG. 27 is a typical graph demonstrating torque and energy delivered to an output shaft.

With a shunt such as gears 454, 458 and shaft 456 of FIGS. 18 and 19, the torque, over one cycle splits into two paths. FIG. 27 shows a typical graph of the instantaneous total torque profile over one cycle of operation of the torque generator of this invention. The torque generated by the torque generator alone is also marked. The non-generated torque is delivered through the shunt path.

It is important again to reemphasize that wherever planetary gears are shown, two, three, four or more planetary gears may be operating together to turn, for example, a common planetary gear carrier or disk.

It is also important to reemphasize that the torque generators of this invention may be utilized alone, or they may be utilized together as shown in the embodiment of FIGS. 1 through 12. In FIGS. 1 through 12, three torque generator shafts, each having two torque generators thereon, are used. On each shaft, the two torque generators are phased relative to each other, and the direction of eccentricity of the offset of the weight attaching bearings are shown today in the same plane on the two generators. It must again be stressed that the plane of the offset of the axes of the offset bearings of one torque generator need not be in the same or parallel planes to the offset of the axes of the other torque generator on the same shaft. The phase of each generator is measured with respect to the plane of the axes of its own offset bearings.

Further, the corresponding torque generators on the three torque generating trains are preferably phased 120° apart. That is, when the weights of one torque generator are aligned in their no-torque position in the plane of their bearing axes, the cages of the other torque generators, and the corresponding weights, are advanced and retarded 120° respectively, relative to the plane of the axes of their bearings. It is apparent that should only two torque generators be used, they would be phased 180° apart; with four torque generators, the phasing would be 90° apart; with six torque generators, the phasing would be 60° apart; and other numbers of torque generators would divide 360° equally to determine the desired phase relation.

It is also important to point out the similarity and differences between the torque generator embodiments of FIGS. 1 through 16 and the torque generator embodiments of FIGS. 17, 19, 21, and 22. In the embodiment of FIGS. 1 through 16, the radius of eccentricity of the bearings of the weights have a relatively short arm. The weights, however, are positioned relatively far from their bearing connections. In the embodiment of FIGS. 17, 19, 21, and 22, the weights are relatively close to their attaching bearings, and the attaching bearings are offset a significant distance from the axis of rotation of the input shaft to the torque generator. Thus, the kinematics are substantially the same in the two embodiments, but the lengths of the linkage arms are reversed.

In summary, the apparatus of this invention is a continuously variable transmission having the following desirable characteristics:

1. Without external control, the output torque is typically maintained inversely proportional to the output annular velocity. Thus, with the low internal losses of the apparatus of this invention, the input power can be kept constant with varying output conditions.

2. With external control, the apparatus of this invention may have its output velocity controlled while using a power source attached to its input shaft which generates a constant velocity. Such constant velocity sources, for example, include certain electric driving motors or turbine engines.

3. The apparatus of this invention may also be used with a controlled input velocity from a varying power source, such as an internal combustion engine, in a manner to ensure that the driving engine operates at the minimum specific fuel consumption for a given load.

4. By using a torque or power splitting shunt around the torque converter, as shown in FIG. 19, the apparatus may be used in conjunction with a high-speed engine, such as a turbine engine, with gearing reducing the input angular velocity by a factor of ten or more with the same flexibility described above.

5. The apparatus of this invention eliminates the need for a differential in an automobile because there is no direct connection between the engine and the wheels. For example, with a drive wheel on the inside of a corner, the torque to it increases in inverse proportion to its speed while the driving engine speed remains fixed.

6. The apparatus of this invention is a convenient means for transferring power to and from a power-storage device such as a flywheel. A flywheel inherently must have its speed changed as the power stored increases or decreases. A power source precisely defined for maximum fuel economy may be applied to the input shaft while varying the output shaft attached to the flywheel. Matching of the power source to the varying flywheel velocity with prior art devices presents an almost insurmountable problem which is solved with the infinitely variable transmission of this invention. It is the wide torque and angular velocity variability allowed with the apparatus of this invention that makes it practical for driving a flywheel.

7. The apparatus of this invention also utilizes the inherent efficiency and transmission life of a direct drive for highway speeds. The lock-up ability of the transmission of this invention eliminates cycling of the one-way clutches used in the torque generators, eliminates periodic loading of all of the gears, and it eliminates relative motion of all of the gears of the input planetary and all gears, weights, bearings, and so on within the cage. In addition, it provides engine braking.

Specifically, one embodiment of the invention uses an eccentric mass oscillatory torque generator which, in a preferred embodiment, uses two uni-directional clutches-one shunted to the frame and the other in series with the output shaft.

Another embodiment of the invention uses an eccentric drive oscillatory torque generator which, in a preferred embodiment, uses two uni-directional clutches-one shunted to ground and the other in series to the output.

By using alternative gear arrangements, the embodiments above may be configured so that both clutches, as in FIGS. 19 and 20, may be shunted to the frame.

With the clutch to the frame, a reverse gear may be used, as in FIGS. 19 and 20, in combination with the clutches.

Further, in some embodiments, the series clutch may be eliminated by using a non-linear spring. The non-linear spring preferably has a back-lash stop clutch which allows the spring to drive in only one direction.

One embodiment of the invention also uses a spiral spline combination such as that shown in FIGS. 1 through 12 and FIG. 17 to vary the phasing between two pairs of weights in a torque generator of this invention.

The phasing between the weight pairs may also be varied by using the rubbing blocks 240 and 242 together with the wheel 234, gears 237, 238, worm 232, and a variably positioned caging portion such as the disk 228 of FIG. 13.

It is also a feature of the invention to use a bypass such as shaft 456 of FIGS. 18 and 19, together with planetary gears at the input and output shaft as shown in FIGS. 18 and 19 to divide torque and power between the torque generator and the bypass or shunt shaft.

Means are also provided for braking the cages of the torque generators to cause all of the power to be delivered through a shunt shaft such as 256.

Numerous reversing gear mechanisms are also part of the apparatus of this invention.

Although the invention has been described in detail above, it is not intended that the invention should be limited by that description, but only in accordance with the spirit and scope of the appended claims.

I claim:

1. In combination: a frame;
   an input shaft having a first axis, and an output shaft having a second axis substantially coaxial to said first axis and both said shafts mounted for rotation relative to said frame;
   a cage rigidly connected to said input shaft to rotate with said input shaft about said first axis;
   a sun gear rigidly connected to said output shaft;
   a third shaft having a third axis which is parallel to but offset from said first axis and connected to said cage for rotation therewith about said first axis;
   a first weight having an eccentricity about said third axis and rigidly attached to rotate with said third shaft about said third axis relative to said cage;
   a planetary gear rigidly connected to said third shaft to rotate with said first weight about said third axis;
   an idler gear meshing with said sun gear and with said planetary gear and positioned therebetween, mounted for rotation relative to said cage about a fourth shaft having a fourth axis substantially parallel to said first, second and third axes;
   said planetary and sun gears having the same number of teeth;
   and a uni-directional clutch on said frame, connected to be driven by said output shaft to allow said output shaft to be driven in only a first predetermined direction relative to said frame.

2. Apparatus as recited in claim 1 and further comprising a second uni-directional clutch on said frame connectable to be driven by said output shaft to allow said output shaft to turn in only a second predetermined direction relative to said frame, and means for selectively connecting and disconnecting said first-named and said second-named uni-directional clutches to and from said output shaft.

3. Apparatus as recited in claim 1 and further comprising a reverse gear mechanism attached to said output shaft.

4. Apparatus as recited in claim 1 and further comprising bypass means including gearing and a bypass shaft connected between said input and output shafts.

5. An apparatus as recited in claim 4 and further comprising gearing between said input shaft and said cage, and gearing between said input shaft and said bypass shaft to adjust the speeds of operation.

6. Apparatus as recited in claim 1 and further comprising:
   a fifth shaft, having a fifth axis offset an equidistance from and diametrically opposed to said third axis relative to said first axis, connected to said cage for rotation therewith about said first axis;
   a second weight, having an eccentricity about said fifth axis equal to the eccentricity of said first weight about its said third axis, rigidly attached to rotate with said fifth shaft about said fifth axis;
   a second planetary gear rigidly attached to said fifth shaft for rotation with said second weight about said fifth axis relative to said cage;
   a second idler gear, meshing with said second planetary gear and said sun gear and positioned therebetween, rotatable on a sixth shaft relative to said cage about a sixth axis substantially parallel to said first, second, third, fourth and fifth axes;
   said second planetary gear having the same number of teeth as said sun gear and said first planetary gear.

7. The apparatus as recited in claim 1 and further comprising seventh and eighth shafts, having seventh and eighth axes positioned on opposite ends of a diameter and equidistance from said first axis as said third and fifth axes, but said seventh and eighth axes being positioned circumferentially ninety degrees from said first and third axes, attached to said cage to rotate therewith about said first axis;

a second sun gear rigidly attached to a ninth shaft whose ninth axis is substantially coaxial with said first and second axes;

third and fourth weights rigidly attached to said seventh and eighth shafts to rotate therewith, respectively, and having the same eccentricity relative to their respective shafts as the eccentricity of said first and second weights relative to their shafts;

third and fourth planetary gears rigidly connected to rotate about said seventh and eighth shafts with said third and fourth weights, respectively, said planetary gears having the same number of teeth as said second sun gear;

third and fourth idler gears rotatable about tenth and eleventh shafts, whose tenth and eleventh axes are substantially parallel to said first, second, third, fourth, fifth, sixth, seventh, eighth and ninth axes, relative to said cage, meshing with and connecting said third and fourth planetary gears, respectively, to said second sun gear; and angularly continuously adjustable means connected between said ninth shaft and said output shaft to adjust the phase of the angular position of said third and fourth weights relative to said first and second weights.

8. The combination of claim 7, in which said angularly adjustable means comprises:

a first sleeve attached to said ninth shaft and coaxial therewith and having spiral splines on the interior thereof;

straight splines attached to said output shaft in the region of said sleeve;

and a second sleeve having internal straight splines slidable upon said output shaft splines and spiral splines on the exterior thereof meshing with the spiral splines on the interior of said first sleeve so that axial motion of said second sleeve along said output shaft causes said first sleeve to turn relative to said output shaft and to turn said second sun gear through a controlled angle relative to said first sun gear.

9. The apparatus as recited in claim 8 and further comprising a spool attached to said second sleeve and fork means movably mounted upon said frame with its tines engaging said spool controllably to move said spool and said second sleeve along said output shaft.

10. Apparatus as recited in claim 9 and further comprising servo control means for controlling the position of said fork, said spool and said second sleeve.

* * * * *

UNITED STATES PATENT AND TRADEMARK OFFICE
CERTIFICATE OF CORRECTION

PATENT NO. : 4,307,629
DATED : December 29, 1981
INVENTOR(S) : Paul S. Moller

It is certified that error appears in the above—identified patent and that said Letters Patent is hereby corrected as shown below:

Column 1, line 62, remove "spaced", and substitute therefor --speed--;
Column 1, line 67, remove "Presently", and substitute therefor --Present--;
Column 2, line 16, remove "kinematic", and substitute therefor --kinematics--;
Column 2, line 42, remove "connect to", and substitute therefor --connect the--;
Column 3, line 26, after "is", and before "partly", insert --a--;
Column 3, line 30, remove "8-9", and substitute therefor --9-9--;
Column 6, line 45, after "axes", and before "bearing", insert --of--;
Column 7, line 15, remove "three", and substitute therefor --two--;
Column 7, line 38, remove "to shift", and substitute therefor --shifting--;
Column 7, line 43, remove "stil", and substitute therefor --still--;
Column 8, line 5, after "188", and before "to", insert a comma;
Column 8, line 5, after "192", and before "or", insert a comma;
Column 8, line 5, after "194", insert a comma;
Column 8, line 22, after "tively", and before "to", insert a comma;
Column 10, line 8, after "251", and before "by", insert a parenthesis;
Column 10, line 8, after "means", and before "not", delete the parenthesis;

UNITED STATES PATENT AND TRADEMARK OFFICE
CERTIFICATE OF CORRECTION

PATENT NO. : 4,307,629                      Page 2 of 2
DATED : December 29, 1981
INVENTOR(S) : Paul S. Moller It is certified that error appears in the above—identified patent and that said Letters Patent is hereby corrected as shown below:

```
Column 12, line 1, remove "linked", and substitute therefor --link;
Column 12, line 13, remove "rotated", and substitute therefor
  --rotate--;
Column 12, line 28, remove "four", and substitute therefor
  --three--;
Column 12, line 29, remove "diameterically", and substitute
  therefor --diametrically--;
Column 13, line 28, after "and", and before "third", insert
  --a--;
Column 17, line 41, remove "transmissions cycle has", and
  substitute therefor --transmitted has a--;
Column 17, line 67, remove "today", and substitute therefor
  --to be--;
Column 18, line 42, remove "annular", and substitute therefor
  --angular--;
Column 20, line 67, remove "1", and substitute therefor --6--;
Column 21, line 2, remove "equidistance", and substitute therefor
  --equidistant--;
Column 22, line 12, remove "slidable", and substitute therefor
  --slideable--.
```

Signed and Sealed this

Twenty-seventh Day of July 1982

[SEAL]

Attest:

GERALD J. MOSSINGHOFF

Attesting Officer      Commissioner of Patents and Trademarks